（12）United States Patent
Kim et al.

(10) Patent No.: US 11,700,311 B2
(45) Date of Patent: Jul. 11, 2023

(54) ELECTRONIC APPARATUS AND OPERATING METHOD THEREOF FOR DETERMINING SESSION DURATION TIME OF CHATBOT

(71) Applicant: Samsung Electronics Co., Ltd., Suwon-si (KR)

(72) Inventors: Hoyoung Kim, Suwon-si (KR); Dongil Yang, Suwon-si (KR); Jaehyung An, Suwon-si (KR); Jiyeon Lee, Suwon-si (KR); Cheolseung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 17/584,967

(22) Filed: Jan. 26, 2022

(65) Prior Publication Data
US 2022/0247822 A1 Aug. 4, 2022

Related U.S. Application Data

(63) Continuation of application No. PCT/KR2022/001093, filed on Jan. 21, 2022.

(30) Foreign Application Priority Data

Jan. 29, 2021 (KR) ........................ 10-2021-0013472

(51) Int. Cl.
*H04L 67/143* (2022.01)
*H04L 51/02* (2022.01)
(Continued)

(52) U.S. Cl.
CPC ............ *H04L 67/143* (2013.01); *H04L 51/02* (2013.01); *H04L 51/216* (2022.05); *H04L 67/535* (2022.05)

(58) Field of Classification Search
CPC ... H04L 67/143; H04L 51/216; H04L 67/535; H04L 51/02
See application file for complete search history.

(56) References Cited

U.S. PATENT DOCUMENTS 9,026,444 B2 * 5/2015 Ljolje .................. G10L 15/083
  704/257
10,762,423 B2 * 9/2020 Henry ............ G06Q 10/063112
(Continued)

FOREIGN PATENT DOCUMENTS

JP 2019-175464 A 10/2019
KR 10-2019-0104119 A 9/2019
(Continued)

OTHER PUBLICATIONS

International Search Report dated May 9, 2022, issued in International Application No. PCT/KR2022/001093.

*Primary Examiner* — Sargon N Nano
(74) *Attorney, Agent, or Firm* — Jefferson IP Law, LLP

(57) ABSTRACT

An electronic apparatus and an operation method thereof for determining a session duration time according to a characteristic of a response message in a chatbot are provided. The electronic apparatus is configured to determine a default session time based on a difficulty level of the response message, determine an additional session time based on conversation history information through the chatbot prior to outputting of the response message, determine a session duration time, which is a sum of the default session time and the additional session time, and provide the session duration time.

13 Claims, 15 Drawing Sheets

(51) Int. Cl.
    *H04L 51/216*     (2022.01)
    *H04L 67/50*     (2022.01)

(56) References Cited

U.S. PATENT DOCUMENTS

| | | | |
|---|---|---|---|
| 11,082,368 | B2 | 8/2021 | Chung et al. |
| 2011/0066433 | A1* | 3/2011 | Ljolje .................. G10L 15/32 |
| | | | 704/E15.04 |
| 2016/0155096 | A1* | 6/2016 | Choi .................. G06Q 10/1097 |
| | | | 705/7.21 |
| 2019/0068526 | A1* | 2/2019 | Xie ....................... H04L 67/303 |
| 2019/0182184 | A1 | 6/2019 | Myung et al. |
| 2019/0215249 | A1 | 7/2019 | Renard et al. |
| 2020/0052920 | A1* | 2/2020 | Kwatra ................ H04M 3/565 |
| 2020/0257687 | A1* | 8/2020 | Pandey ................ G06F 16/958 |
| 2020/0334615 | A1 | 10/2020 | Benjamin et al. |
| 2021/0056966 | A1 | 2/2021 | Bilac et al. |
| 2021/0065702 | A1* | 3/2021 | Fink ........................ G06N 3/08 |
| 2021/0256534 | A1* | 8/2021 | An ........................ G06F 40/216 |
| 2022/0311655 | A1* | 9/2022 | Han .................. G06Q 10/0639 |
| 2023/0048441 | A1* | 2/2023 | Matsuoka .......... G06Q 10/1097 |

FOREIGN PATENT DOCUMENTS

| | | |
|---|---|---|
| KR | 10-1999780 B1 | 9/2019 |
| KR | 10-2020-0090772 A | 7/2020 |
| KR | 10-2020-0108000 A | 9/2020 |

\* cited by examiner

ELECTRONIC APPARATUS AND OPERATING METHOD THEREOF FOR DETERMINING SESSION DURATION TIME OF CHATBOT

CROSS-REFERENCE TO RELATED APPLICATION(S)

This application is a continuation application, claiming priority under § 365(c), of an International application No. PCT/KR2022/001093, filed on Jan. 21, 2022, which is based on and claims the benefit of a Korean patent application number 10-2021-0013472, filed on Jan. 29, 2021, in the Korean Intellectual Property Office, the disclosure of which is incorporated by reference herein in its entirety.

TECHNICAL FIELD

The disclosure relates to an electronic apparatus and an operating method thereof for determining the length of time a chatbot maintains a session in which a response message regarding an input message of a user is provided.

BACKGROUND ART

When a user inputs a query message in the electronic apparatus or asks questions through a voice message, a system for providing an answer to the user's question is being used. More particularly, recently, with the development of artificial intelligence and Big Data technology, intelligent response systems, such as chatbots are widely used. "Chatbot" is an abbreviation of chatting robot, and is an artificial intelligence service configured to perform operations, such as providing information about questions through conversations with users using voice signals or texts, or providing services with respect to requests. The chatbot, which is a service that interacts through a messenger application, is provided through a preset rule or artificial intelligence technology.

In conversations through a chatbot, the session duration time is determined in terms of personal information protection of the user, and the session ends when the session duration time elapses. The session duration time is updated by an input of the user. When the session ends with the elapse of the session duration time before an issue is completely resolved, to get back to a problem solving scenario that was previously in progress, the user may have to input a message that was input at a previous point of time again and be provided with the same response message again, which may be cumbersome and time consuming. In addition, even though different processing times are required according to problem solving scenarios, because a blanket session duration time is provided, there may be problems in which the session is unintentionally terminated due to the time spent by the user in solving an issue.

Extending the session duration time for all problem solving scenarios may be considered as a solution. However, such a solution may cause additional resources to be used due to the increase in the number of simultaneously managed sessions and the corresponding increase in costs, and there is a higher risk of leakage of personal information.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an electronic apparatus for providing a session duration time suitable for a problem solving scenario by determining a default session time and an additional session time, according to a characteristic of a reply message.

Additional aspects will be set forth in part in the description which follows and, in part, will be apparent from the description, or may be learned by practice of the presented embodiments.

Technical Solution to Problem

In accordance with an aspect of the disclosure, a method of determining a session duration time of a chatbot is provided. The method includes outputting a response message regarding an input message of a user, determining a default session time during which a session is maintained based on a difficulty level of the output response message, determining an additional session time based on a conversation history information through the chatbot prior to outputting of the response message, waiting for an input of an additional message of the user during a session duration time, which is a sum of the default session time and the additional session time, and determining an end of the session based on whether the additional message is input.

According to an embodiment of the disclosure, the determining of the default session time may include obtaining an output label value of the difficulty level by applying the response message to a deep neural network model as an input, and determining a session time mapped to correspond to the obtained label value as the default session time.

According to an embodiment of the disclosure, the deep neural network model may be an artificial intelligence model trained through supervised learning wherein a plurality of training messages are applied as an input and the label value of the difficulty level is applied as an output groundtruth.

According to an embodiment of the disclosure, the conversation history information may include information about at least one of a number of previously output response messages in a conversation prior to outputting of the response message or a session use time in a scenario performed according to the previously output response message.

According to an embodiment of the disclosure, the additional session time may be determined by a preset ratio of a sum of the session use time for each scenario.

According to an embodiment of the disclosure, the determining of the additional session time may include calculating a session time usage rate by performing an arithmetic operation of dividing the session use time for each scenario by the default session time, comparing the calculated session time usage rate with a preset threshold, and determining the additional session time based on a result of the comparing.

According to an embodiment of the disclosure, the determining of the additional session time may include calculating an average value of the session use time prior to outputting of the response message, comparing the calculated average value with a preset threshold, and determining the additional session time based on a result of the comparing.

According to an embodiment of the disclosure, the determining of the end of the session may include outputting a session end notification providing information about the end of the session prior to the session duration time elapsing.

According to an embodiment of the disclosure, the determining of the session duration time may further include storing session usage history information of a plurality of users regarding the output response message, and adjusting the default session time based on the stored session usage history information of the plurality of users.

According to an embodiment of the disclosure, the session usage history information may include statistical data of the plurality of users regarding at least one of a number of session extension requests at a time point prior to outputting of the response message, a number of scenarios performed prior to the response message, or a session use time used for the response message.

In accordance with another aspect of the disclosure, an electronic apparatus for determining the session duration time of the chatbot is provided. The electronic apparatus includes a communication interface configured to perform transmission and reception of data with other devices, a memory, and a processor configured to execute one or more instructions, wherein the processor is further configured to execute the one or more instructions to obtain an input message input by a user through the communication interface, output a response message regarding the input message of the user, determine a default session time during which a session is maintained based on a difficulty level of the output response message, determine an additional session time based on a conversation history information through the chatbot prior to outputting of the response message, wait for an input of an additional message by the user during a session duration time, which is a sum of the default session time and the additional session time, and determine an end of the session based on whether the additional message is input.

According to an embodiment of the disclosure, the processor may obtain an output label value of the difficulty level by applying the response message to a deep neural network model as an input, and determine a session time mapped to correspond to the obtained label value as the default session time.

According to an embodiment of the disclosure, the deep neural network model may be an artificial intelligence model trained through supervised learning wherein a plurality of training messages are applied as an input and the label value of the difficulty level is applied as an output groundtruth.

According to an embodiment of the disclosure, the conversation history information may include information about at least one of a number of previously output response messages in a conversation prior to the outputting of the response message and a session use time in a scenario performed according to the previously output response message.

According to an embodiment of the disclosure, the processor may further be configured to execute the one or more instructions to determine the additional session time by a preset rate of a sum of the session use time for each scenario.

According to an embodiment of the disclosure, the processor may further be configured to execute the one or more instructions to calculate a session time usage rate by performing an arithmetic operation of dividing the session use time for each scenario by the default session time, compare the calculated session time usage rate with a preset threshold, and determine the additional session time based on a result of comparing.

According to an embodiment of the disclosure, the processor may further be configured to execute the one or more instructions to output a session end notification providing information about the end of the session prior to the session duration time elapsing.

According to an embodiment of the disclosure, the processor may further be configured to execute the one or more instructions to store, in a database of the memory, a session usage history information of a plurality of users regarding the output response message, and adjust the default session time based on the stored session usage history information of the plurality of users.

According to an embodiment of the disclosure, the session usage history information may include statistical data of the plurality of users regarding at least one of a number of session extension requests at a time point prior to outputting of the response message, a number of scenarios performed prior to the response message, or a session use time used for the response message.

In accordance with another aspect of the disclosure, a computer program product is provided. The computer program product includes a computer-readable storage medium having stored therein a program to be executed on a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE OF DISCLOSURE

Figure 1:
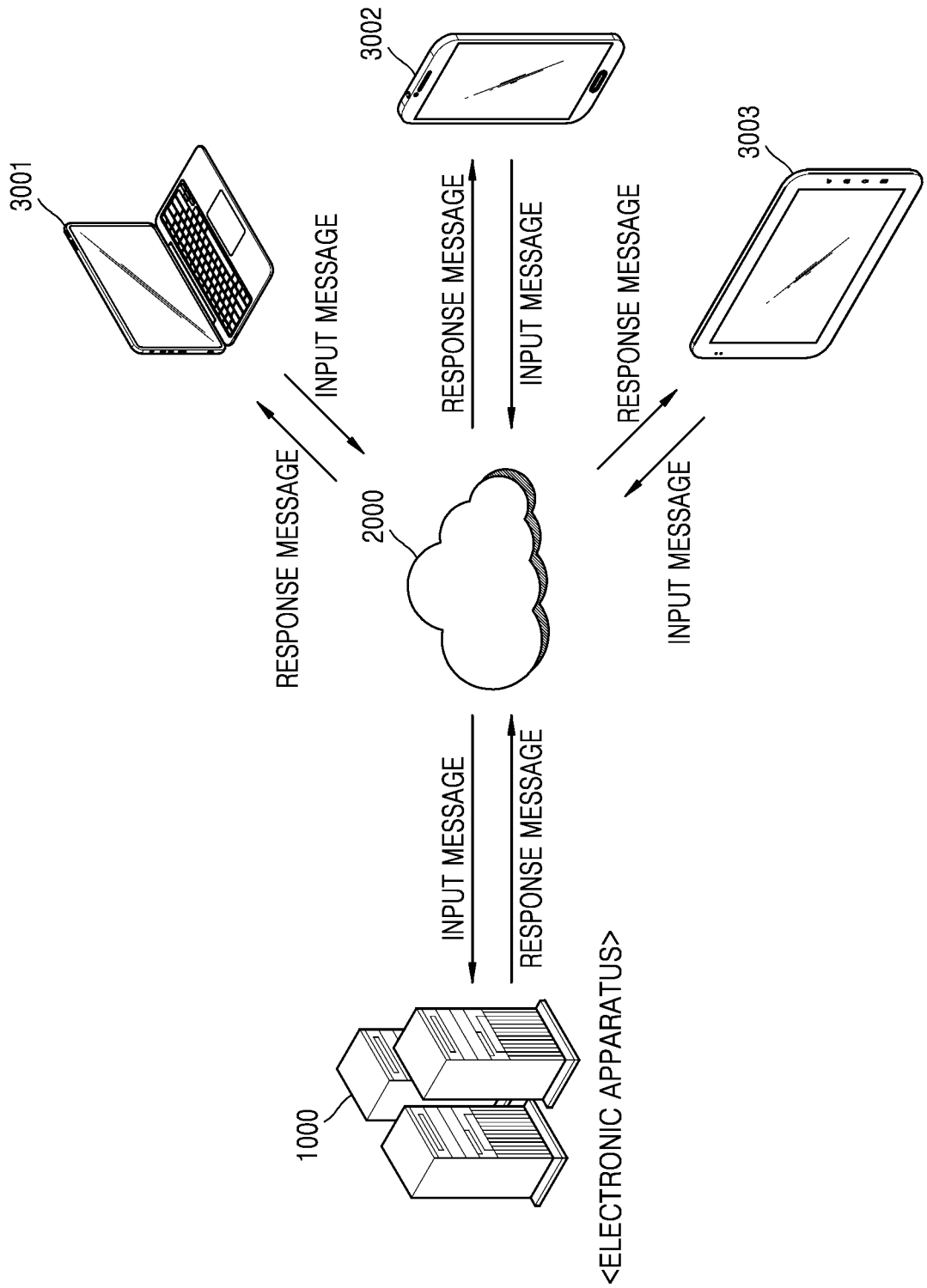
FIG. 1 is a conceptual view illustrating a method, performed by an electronic apparatus, of providing a chatbot service to client devices through a network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Although terms used in embodiments of the specification are selected from among general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

It is to be understood that a singular form of a noun corresponding to an item may include one or more of the things, unless the relevant context clearly indicates otherwise. All of the terms used herein including technical or scientific terms have the same meanings as those generally understood by those of ordinary skill in a technical field described in the specification.

Throughout the entirety of the disclosure, when it is assumed that a certain part includes a certain component, the term 'including' means that a corresponding component may further include other components unless a specific meaning opposed to the corresponding component is written. The term used in the specification, such as "unit" or "module" indicates a unit for processing at least one function or operation, and may be implemented in hardware, software, or in a combination of hardware and software.

An expression "configured (or set) to" used in the specification may be replaced with, for example, "suitable for," "having the capacity to," "designed to," "adapted to," "made to," or "capable of" according to a situation. The term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that may perform a corresponding operation by executing at least one software program stored in a memory.

In the disclosure, "chatbot" is an abbreviation of chatting robot, and is an artificial intelligence service configured to perform operations, such as providing information about questions through dialogues with users using voice signals or texts, or providing services with respect to requests. The chatbot, which is a service that interacts through a messenger application, is provided through a preset rule or artificial intelligence technology.

In the disclosure, a "session" is a group of messages of the user and response messages of the chatbot input during a certain period through the chatbot.

In the disclosure, a "session duration time" is the time during which the session is maintained and not terminated. The session duration time starts from a time when the response message of the chatbot to the input message of the user is output. The session duration time is updated and initialized at a time when the user inputs a message.

In the disclosure, the "session use time" is the time during which the user uses the session, and refers to a time interval between the time when the response message of the chatbot is output and the time when the user inputs an answer message or an additional message regarding the response message.

In the disclosure, the "scenario" is a problem solving operation (or process), such as requesting, questioning, answering, or providing information through the response message provided by the chatbot with respect to the input message of the user. For example, when the input message is "Application regarding a breakdown", the scenario may refer to the problem solving operation through response messages related to requesting, questioning, answering, or providing information by the chatbot until the application regarding the breakdown is completed. The session use time and the scenario will be described with reference to FIG. 7.

FIG. 1 is a conceptual view illustrating a method, performed by an electronic apparatus, of providing a chatbot service to client devices through a network, according to an embodiment of the disclosure.

Referring to FIG. 1, an electronic apparatus 1000 is a computing device which receives input messages from the users of client devices 3001, 3002, and 3003 and provides response messages regarding the input messages. According to an embodiment of the disclosure, the electronic apparatus 1000 may be implemented as a chatbot that provides the response message regarding the input message, but is not limited thereto.

According to an embodiment of the disclosure, the electronic apparatus 1000 may include a server or a workstation. However, the disclosure is not limited thereto, and the electronic apparatus 1000 may include at least one of, for example, a smart phone, a tablet personal computer (PC), a mobile phone, a video phone, an e-book reader, a desktop personal computer (PC), a laptop PC, a netbook computer, a personal digital assistant (PDA), or a portable multimedia player (PMP).

The electronic apparatus 1000 may transmit or receive data to and from the client devices 3001, 3002, and 3003 through the network 2000. The network 2000 may be configured without being limited to a certain communication method, such as wired or wireless communication. The network 2000 may include at least one wired or wireless data communication method including, for example, Ethernet, wired or wireless local area network (LAN), Wi-Fi, Wi-Fi Direct (WFD), and wireless gigabit alliance (WiGig).

The client devices 3001, 3002, and 3003 are terminals used by the user to receive the chatbot service from the electronic apparatus 1000 through the chatbot application. According to an embodiment of the disclosure, the user may execute the chatbot application through the client devices 3001, 3002, and 3003, input text message to the chatbot application, and receive the response message from the electronic apparatus 1000. According to an embodiment of the disclosure, the client devices 3001, 3002, and 3003 may receive speech input from the user, convert the speech input to a text and transmit the text to the electronic apparatus 1000, and receive the response message to the texts from the electronic apparatus 1000.

The client devices 3001, 3002, and 3003 may include, for example, a smart phone, a tablet PC, a mobile phone, a video phone, an e-book reader, a desktop PC, a laptop PC, a netbook computer, PDA, or a PMP.

The electronic apparatus 1000 of the disclosure is not limited to receiving the input message from the client devices 3001, 3002, and 3003 through the network 2000 and providing the response message to the client devices 3001, 3002, and 3003, as illustrated in FIG. 1. According to an embodiment of the disclosure, the electronic apparatus 1000 may, unlike the embodiment illustrated in FIG. 1, receive the input message directly from the user without intervention of the network 2000, and output the response message to the input message.

Figure 2:
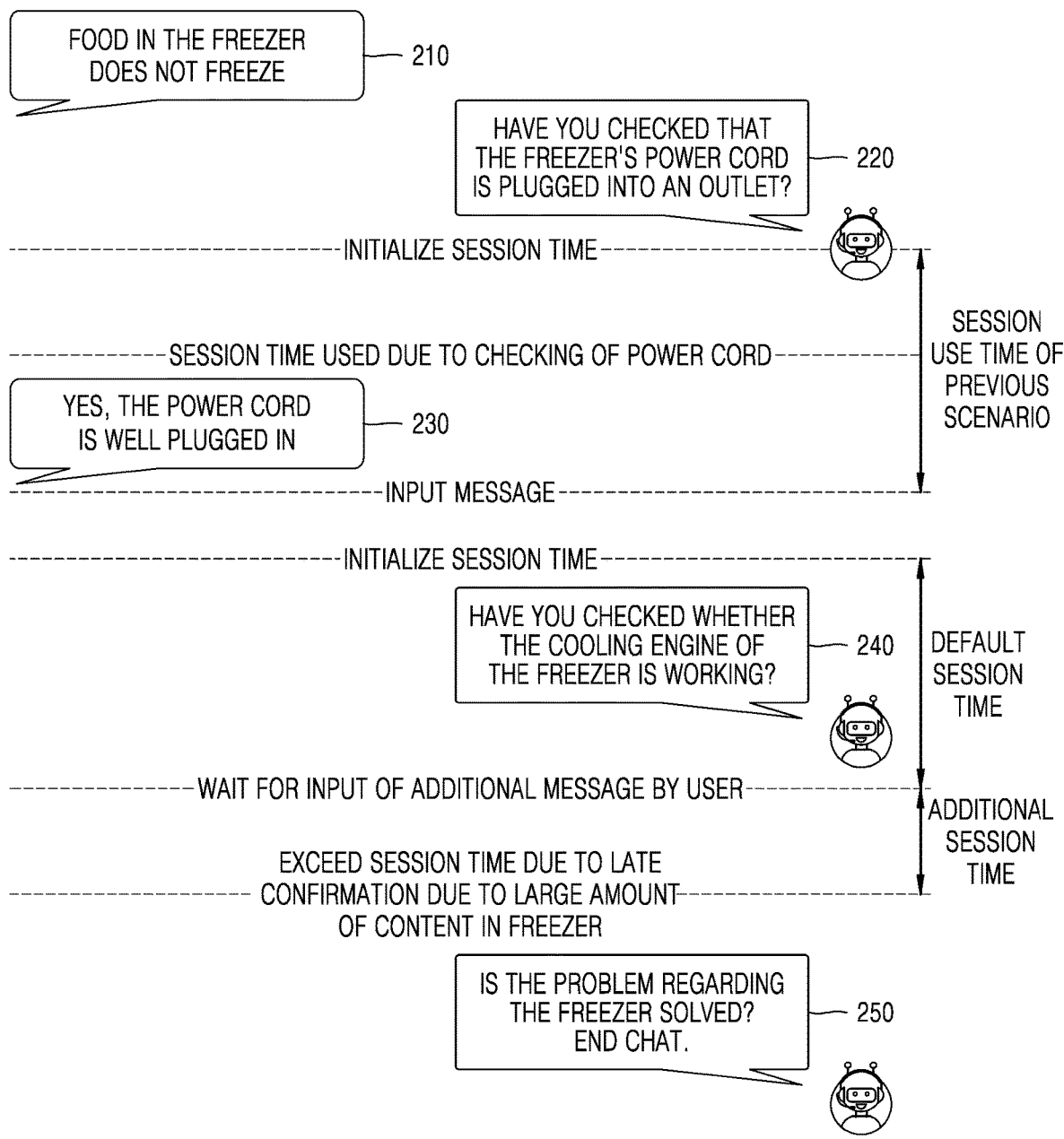
FIG. 2 is a conceptual view illustrating a method, performed by an electronic apparatus, of determining a session duration time, according to an embodiment of the disclosure.

FIG. 2 is a conceptual view illustrating a method, performed by an electronic apparatus, of determining a session duration time, according to an embodiment of the disclosure.

Referring to FIG. 2, a chatbot conversation screen is illustrated. The electronic apparatus 1000 may receive a first input message 210 "Food in the freezer does not freeze" from the user and output a first response message 220 regarding the first input message 210. The first response message 220 may be a message requesting confirmation from the user regarding the first input message 210. For example, the first response message 220 may be "Have you checked that the freezer's power cord is plugged into an outlet?"

The electronic apparatus 1000 may initialize the session time at the time when the first response message 220 is output. The electronic apparatus 1000 may wait for an input of an additional message by the user during a preset default session duration time. The session time may be used by the user due to checking of the power cord.

When a second input message 230 is input by the user, the electronic apparatus 1000 may output a second response message 240 regarding the second input message 230. According to an embodiment of the disclosure, the second input message 230 may include a response or an additional question by the user regarding the first response message 220. In the embodiment of the disclosure shown in FIG. 2, the second input message 230 may be "Yes, the power cord is well plugged in." The second response message 240 may be a message regarding an additional request, response, or provision of information by the chatbot regarding the second input message 230. In the embodiment of the disclosure shown in FIG. 2, the second response message 240 may be "Have you checked whether the cooling engine of the freezer is working?" The electronic apparatus 1000 may initialize the session time at the time when the second response message 240 is output.

The electronic apparatus 1000 may determine a default session time based on a difficulty level of the second response message 240. The difficulty level of the second response message 240 refers to a degree of difficulty and ease of solving a problem through requesting, questioning, or providing information by the response message. According to an embodiment of the disclosure, the electronic apparatus 1000 may perform training for classifying the response message according to the difficulty level using a deep neural network model, and obtain information about the difficulty level of the second response message 240 through the deep neural network model. The electronic apparatus 1000 may determine the session time mapped to correspond to the difficulty level as the default session time.

The electronic apparatus 1000 may wait for the input of the additional message by the user during the default session time. When the additional message of the user is not input even when the default session time has elapsed, the electronic apparatus 1000 may determine whether to provide an additional session time. The electronic apparatus 1000 may determine the additional session time based on a currently output response message, that is, conversation history information prior to outputting of the second response message 240. According to an embodiment of the disclosure, the electronic apparatus 1000 may determine the additional session time based on information about at least one of the number of previously output response messages prior to outputting of the second response message 240 or the session use time used in the scenario performed through the previously output response message.

In the embodiment of the disclosure shown in FIG. 2, the electronic apparatus 1000 may identify the first response message 220 output prior to outputting of the current message, that is, the second response message 240, obtain information about the session use time used by the user until the second input message 230 is input by the user during the scenario regarding the first response message 220, and determine the additional session time based on the number of the first response messages 220 and the session use time of the previous scenario.

The electronic apparatus 1000 may determine a certain rate of the default session time as the additional session time. For example, the electronic apparatus 1000 may determine 20% of the default session time as the additional session time.

The electronic apparatus 1000 may determine a sum of the default session time and the additional session time as the session duration time. The electronic apparatus 1000 may identify whether the session duration time has elapsed, and when the session duration time has elapsed, may output a session end notification 250.

According to an embodiment of the disclosure, the electronic apparatus 1000 may extend or reduce the default session time based on statistical data regarding conversation history information of other users regarding the current response message.

In conversations through the chatbot, the session duration time is determined in terms of protection of personal information of the user, and the session is terminated when the session duration time is terminated. In the chatbot according to the related art, because the session is terminated before an issue is completely resolved when the session duration time is elapsed, the user may have to input the message that was input at a previous point of time again and be provided with the same response message again to get back to the problem solving scenario that was previously in progress, which may be cumbersome and time consuming. In addition, even though different processing times are required for the chatbot according to the related art according to the problem solving scenario, because a blanket session duration time is provided, there may be problems in which the session is unintentionally terminated due to the time spent by the user in solving an issue. Extending the session duration time for all problem solving scenarios may be considered as a solution. However, such solution may cause an increase in the number of simultaneously managed sessions by the chatbot, resource usage may increase accordingly, and network costs may increase.

The electronic apparatus 1000 according to an embodiment of the disclosure may provide a chatbot service that adaptively controls the session time according to the problem solving scenario by determining the default session time according to the difficulty level of the response message, determining whether to provide the additional session time based on the conversation history information prior to the currently output response message, and extending or reducing the session time by using the statistical data regarding session usage history information of a plurality of users. Therefore, the electronic apparatus 1000 of the disclosure may have a technical effect in that time consumption and inconvenience of the user due to repeatedly being provided with the same response message due to the session duration time elapsing are prevented and the resource usage and network cost efficiency are improved.

Figure 3:
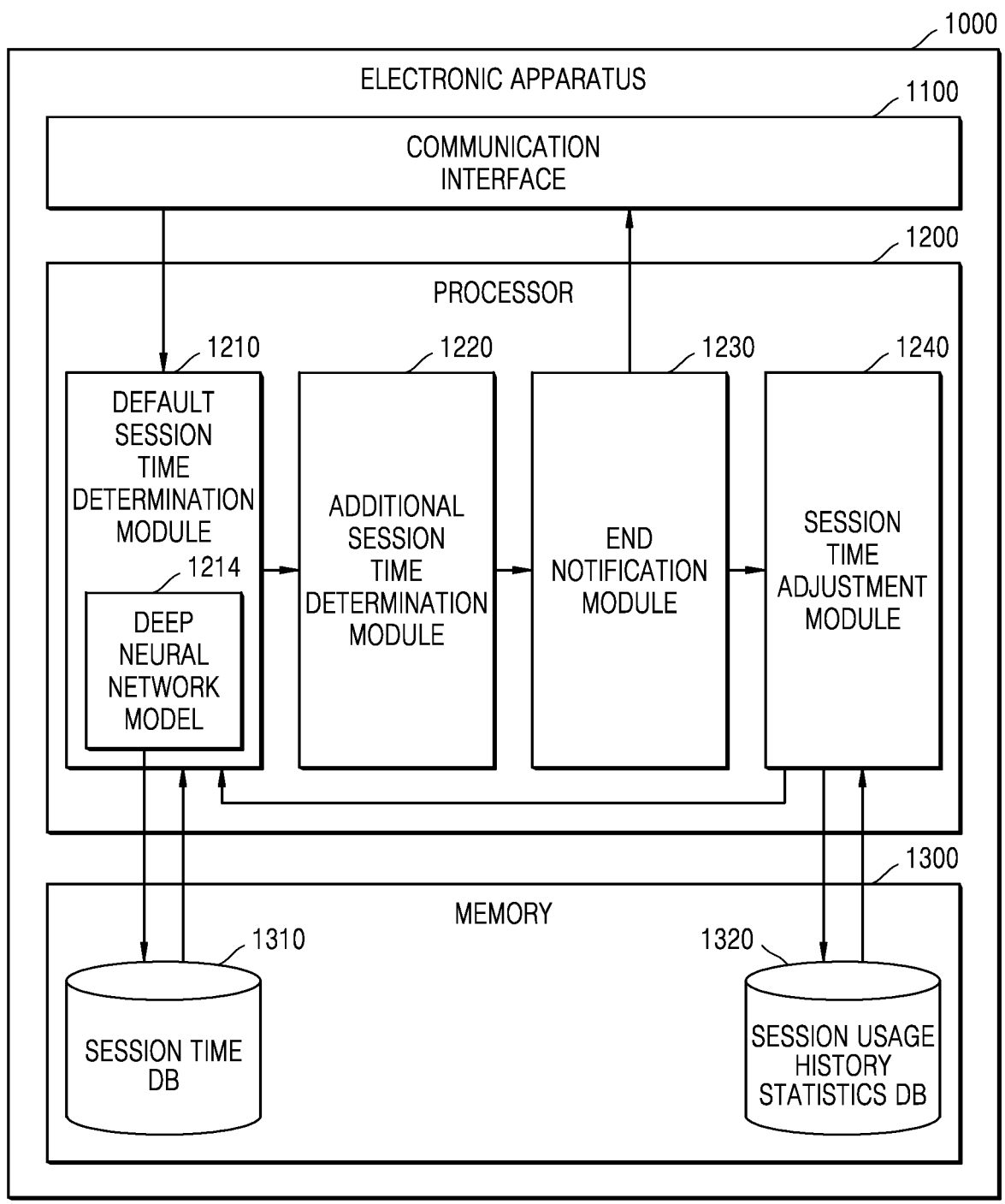
FIG. 3 is a block diagram of components of an electronic apparatus according to an embodiment of the disclosure.

FIG. 3 is a block diagram of components of an electronic apparatus according to an embodiment of the disclosure.

Referring to FIG. 3, the electronic apparatus 1000 may include a communication interface 1100, a processor 1200, and a memory 1300. FIG. 3 only illustrates essential components for explaining the function and/or operation of the electronic apparatus 1000, and the components included in the electronic apparatus 1000 is not limited to those illustrated in FIG. 3.

The communication interface 1100 may be configured to perform transmission and reception of data between the electronic apparatus 1000 and other devices (for example, the client devices 3001, 3002, and 3003). The communication interface 1100 may perform data communication with a server or other devices by using at least one of wired and wireless data communication methods including ethernet, wired or wireless LAN, Wi-Fi, WFD, or WiGig. According to an embodiment of the disclosure, the electronic apparatus 1000 may include a server, receive text data regarding the input message from other devices (for example, the client devices 3001, 3002, and 3003) through the communication interface 1100, and transmit the text data regarding the response message to the other devices.

Although not shown in FIG. 3, the electronic apparatus 1000 may include a speech input interface and an automatic speech recognition (ASR) model. The speech input interface may include an apparatus that receives speech input, such as questions of the user from the user. The speech input interface may include, for example, a microphone. The speech input interface may receive the speech input (for example, a user's utterance) from the user through the microphone, and obtain a speech signal from the received speech input. According to an embodiment of the disclosure, the processor 1200 of the electronic apparatus 1000 may receive the speech input of the user from the microphone, convert the received speech input into an acoustic signal, and obtain the speech signal by removing noise (for example, a non-voice component) from the acoustic signal.

The ASR model is a speech recognition model that recognizes a speech of the user, and is a model trained to convert the speech input received from the user into text and output the converted text. According to an embodiment of the disclosure, the electronic apparatus 1000 may convert the speech input to a text by using the ASR model.

Although not shown in the drawing, the electronic apparatus 1000 may include a speech preprocessing module having a function of detecting a designated speech input (for example, a wake-up input, such as 'Hi Bixby', 'Ok Google', or the like) or a function of preprocessing a speech signal obtained from some speech inputs.

The processor 1200 may be configured to control the electronic apparatus 1000 to perform an operation and/or function by reading and executing one or more instructions or program codes. The memory 1300 may store the instructions or program codes executed by the processor 1200, and the processor 1200 may execute the instructions or program codes loaded from the memory 1300, but is not limited thereto. The processor 1200 itself may include instructions or program codes.

The processor 1200 may include hardware components that perform arithmetic, logic, and input/output operations and signal processing. The processor 1200 may include at least one of a central processing unit (CPU), a microprocessor, a graphics processing unit (GPU), application specific integrated circuits (ASICs), digital signal processors (DSPs), digital signal processing devices (DSPDs), programmable logic devices (PLDs), or field programmable gate arrays (FPGAs), but is not limited thereto.

The memory 1300 may store instructions and program codes readable by the processor 1200. The memory 1300 may include at least one type of storage medium, for example, a flash memory type, a hard disk type, a multimedia card micro type, a card type memory (for example, secure digital (SD) or extreme digital (xD)-picture card memory (XD memory)), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk.

The processor 1200 may include a default session time determination module 1210, an additional session time determination module 1220, an end notification module 1230, and a session time adjustment module 1240.

The processor 1200 may receive the input message of the user through the communication interface 1100. The processor 1200 may recognize a domain, intent, and entity of the input message by analyzing the received input message of the user, and output the response message regarding the domain, intent, and entity of the recognized input message. According to an embodiment of the disclosure, the processor 1200 may parse the text in units of morphemes, words, or phrases by using a natural language understanding model, and infer the meaning of the parsed texts by using linguistic features (for example, grammatical elements) of morphemes, words, or phrases. The processor 1200 may recognize the domain, intent, and entity by comparing the inferred meaning of the word with each of a predefined domain, intent, and entity provided by the natural language understanding model. According to an embodiment of the disclosure, the processor 1200 may output the response message set to correspond to the domain, intent, and entity.

The default session time determination module 1210 is a module configured to obtain information about the difficulty level 540 of the response message by analyzing the output response message, and determine the default session time based on the difficulty level 540 of the response message. According to an embodiment of the disclosure, the default session time determination module 1210 may include a deep neural network model 1214. However, the disclosure is not limited thereto, and the deep neural network model 1214 may be executed by the processor 1200 or stored in the memory 1300 as a separate model from the default session time determination module 1210. The processor 1200 may apply text data of the output response message to the deep neural network model 1214 as an input and obtain an output label value of the difficulty level 540 through the deep neural network model 1214, by executing instructions or program codes with respect to the default session time determination module 1210.

The deep neural network model 1214 may be a model trained to classify the response message according to the difficulty level 540. The deep neural network model 1214 may be implemented as a trained neural model at a time before the response message is output. According to an embodiment of the disclosure, the deep neural network model 1214 may be trained through supervised learning wherein a previously obtained plurality of training messages are applied as an input, and the label value of the difficulty level 540 set with respect to each of the plurality of training messages is applied as an output groundtruth. Here, "difficulty level" 540 means the degree of difficulty and ease of solving problems through requests, questions, answers or information provided by the message. The label values of the difficulty level 540 may be defined as integer values, such as 0, 1, 2, . . . , n, but is not limited thereto.

The deep neural network model 1214 may be implemented as, for example, a convolutional neural network model (CNN), but is not limited thereto. According to an embodiment of the disclosure, the deep neural network model may be implemented as a deep learning-based neural network model, such as a recurrent neural network (RNN), a restricted boltzmann machine (RBM), a deep belief network (DBN), a bidirectional recurrent deep neural network (BRDNN), or Deep Q-Networks.

The processor 1200 may input the response message to the deep neural network model 1214 and obtain the label value of the difficulty level 540, by which the response message may be classified through training, by using the deep neural network model 1214. According to an embodiment of the disclosure, the processor 1200 may search for the obtained label value of the difficulty level 540 from a session time database (DB) 1310 and obtain information about the session time mapped to correspond to the label value from the session time DB 1310.

The session time DB 1310 is a database that stores the session time according to the difficulty level 540. According to an embodiment of the disclosure, the session time DB 1310 may store data of a plurality of label values of difficulties and a plurality of session times. The plurality of session times may be mapped to correspond to the label value of each of the plurality of difficulties. According to an embodiment of the disclosure, the session time DB 1310 may store the label values of each of the plurality of difficulties and data of the plurality of session times as a key-value type.

A detailed embodiment of the disclosure of determining the default session time with respect to the response message by using a default session time determination module 1210 will be described with reference to FIGS. 5A to 5C and 6.

The additional session time determination module 1220 is a module configured to receive information about whether or not the default session time regarding the response message is elapsed from the default session time determination module 1210, and determine the additional session time regarding the response message. The additional session time determination module 1220 may determine the additional session time based on the conversation history information prior to the outputting of the response message. According to an embodiment of the disclosure, the conversation history information may include information about at least one of the number of response messages previously output in a conversation prior to the outputting of the response message or the session use time for each scenario according to the previously output response message.

The processor 1200 may determine whether or not to provide the additional session time based on the conversation history information by executing the instructions or program codes with respect to the additional session time determination module 1220. According to an embodiment of the disclosure, the processor 1200 may calculate a rate of usage of the session time by dividing the session use time of each of the scenario performed prior to the outputting of the response message by the default session time, and determine whether to provide the additional session time based on the calculated rate of usage of the session time. According another embodiment of the disclosure, the processor 1200 may calculate the average value of the session use time for each scenario performed prior to the outputting of the response message, and determine whether to provide the additional session time based on the calculated average value.

The processor 1200 may determine a certain rate of the sum of the session use time for each scenario as the additional session time. A detailed embodiment of the disclosure wherein the processor 1200 determines the additional session time will be described with reference to FIGS. 8 to 10.

The end notification module 1230 is a module configured to output a notification message regarding the end of a session when the session duration time is confirmed as having elapsed. According to an embodiment of the disclosure, the end notification module 1230 may include a natural language generation model. The end notification module 1230 may generate a message that notifies to the user that the session maintenance time has elapsed by using the intent and the entity associated with the response message, and output the generated message. The session end message may be generated and output as, for example, "Is the problem regarding the freezer solved? End chat."

The session duration time may be determined by the sum of the default session time and additional session time. The processor 1200 may identify whether the session duration time has elapsed and output a session end notification message according to a result of identifying by executing the instructions or program codes with respect to the end notification module 1230. An embodiment of the disclosure regarding the output of the session end notification message will be described with reference to FIG. 11.

The session time adjustment module 1240 is a module configured to adjust the default session time based on the session usage history information of the plurality of users regarding the output response message. The session time adjustment module 1240 may receive the information about the elapse of the session duration time from the end notification module 1230, and accordingly, may search for the statistical data regarding the session usage history information about the currently output response message from a session usage history statistics DB 1320. The session time adjustment module 1240 may obtain the session usage history information of the plurality of users according to a search result of the session usage history statistics DB 1320, and may extend or reduce the default session time based on the session usage history information. The session time adjustment module 1240 may provide information about the extended or reduced default session time to the default session time determination module 1210.

The session usage history statistics DB 1320 is a database for storing statistical data regarding the session usage history of the plurality of users. According to an embodiment of the disclosure, the session usage history information may include statistical data of the plurality of users regarding at least one of the number of session extension requests at a time point prior to the outputting of the current response message, the number of scenarios performed prior to the response message, or the session use time used for the response message.

The processor 1200 may search for the statistical data regarding the session usage history of the plurality of users regarding the current response message from the session usage history statistics DB 1320 and obtain the session usage history information according to the search result, by executing the instructions or program codes with respect to the session time adjustment module 1240. The processor 1200 may extend or reduce the default session time based on the session usage history information. A detailed embodiment of the disclosure wherein the processor 1200 adjusts the default session time based on the session usage history information will be described with reference to FIGS. 12 and 13.

The session time DB 1310 and the session usage history statistics DB 1320 may include a non-volatile memory. The non-volatile memory means a storage medium that stores and maintains information even when power is not supplied and may use the stored information again when power is supplied. The non-volatile memory may include at least one of, for example, a flash memory, a hard disk, a solid state drive (SSD), a multimedia card micro type memory, a card type memory (e.g., an SD or an XD memory, or the like), a read only memory (ROM), a magnetic memory, a magnetic disk, or an optical disk.

Referring to FIG. 3, the session time DB 1310 and the session usage history statistics DB 1320 are illustrated to be included in the memory 1300, but are not limited thereto. According to an embodiment of the disclosure, at least one of the session time DB 1310 or the session usage history statistics DB 1320 may be configured in a form of a database separately from the memory 1300. According another embodiment of the disclosure, at least one of the session time DB 1310 or the session usage history statistics DB 1320 may be connected with the electronic apparatus 1000 through the communication interface 1100 through wired or wireless communication as a component of an external device or an external server, not as a component of the electronic apparatus 1000.

Figure 4:
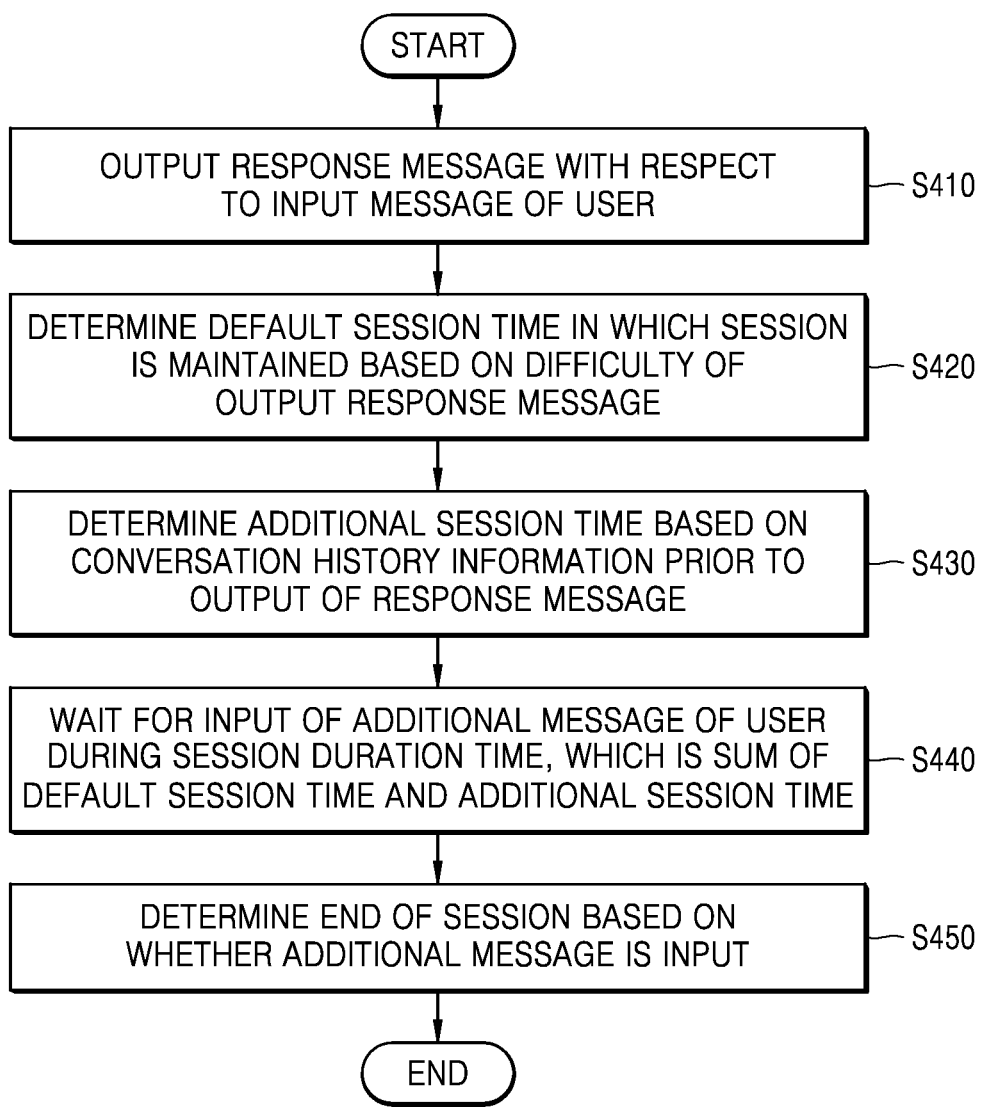
FIG. 4 is a flowchart of an operation method of an electronic apparatus according to an embodiment of the disclosure.

FIG. 4 is a flowchart of an operation method of an electronic apparatus according to an embodiment of the disclosure.

Referring to FIG. 4, in operation S410, the electronic apparatus 1000 may output the response message to the input message of the user. According to an embodiment of the disclosure, the electronic apparatus 1000 may recognize a domain, intent, and entity associated with the input message by analyzing the input message of the user by using the natural language understanding model. According to an embodiment of the disclosure, the electronic apparatus 1000 may parse the text included in the input message in units of morphemes, words, or phrases, and infer the meaning of a word extracted from the parsed text using linguistic features (e.g., grammatical elements) of the morphemes, words, or phrases, by using the natural language understanding model. The electronic apparatus 1000 may recognize the domain, intent, and entity by comparing the inferred meaning of the word with each of a predefined domain, intent, and entity provided by the natural language understanding model.

The electronic apparatus 1000 may output the response message set to correspond to the domain, intent, and entity recognized from the input message. According to an embodiment of the disclosure, the electronic apparatus 1000 may generate a response message for solving a problem related to a domain, intent, and entity using the natural language generation model, and output the generated response message.

In operation S420, the electronic apparatus 1000 may determine the default session time during which the session is maintained based on the difficulty level of the output response message. According to an embodiment of the disclosure, the electronic apparatus 1000 may obtain an output label value of the difficulty level by applying the response message as an input to the deep neural network model, and may determine the session time mapped to correspond to the obtained label value as the default session time. The deep neural network model may be an artificial intelligence model which is trained through supervised learning wherein the previously obtained plurality of training messages are applied as an input, and the label value of the difficulty level is applied as an output groundtruth.

In operation S430, the electronic apparatus 1000 may determine the additional session time based on the conversation history information prior to the outputting of the response message. According to an embodiment of the disclosure, in operation S410, the electronic apparatus 1000 may determine whether to provide the additional session time based on at least one of the number of previously output response messages prior to the outputting of the response message or the session use time used in the scenario performed through the previously output response message. According to an embodiment of the disclosure, a preset rate of the sum of the session use time for each scenario may be determined as the additional session time.

In operation S440, the electronic apparatus 1000 may wait for the input of the additional message of the user during the session duration time, which is the sum of the default session time and the additional session time.

In operation S450, the electronic apparatus 1000 may determine the end of the session based on whether the additional message is input. According to an embodiment of the disclosure, the electronic apparatus 1000 may confirm whether the session duration time has elapsed and output the session end notification message based on a result of the confirmation.

The electronic apparatus 1000 may output a preset session end notification message with respect to the response message, but is not limited thereto. According to an embodiment of the disclosure, the electronic apparatus 1000 may generate a session end notification message asking whether a problem related to the intent and entity recognized from the response message is solved by using the natural language generation model, and output the generated response message.

Figure 5A:
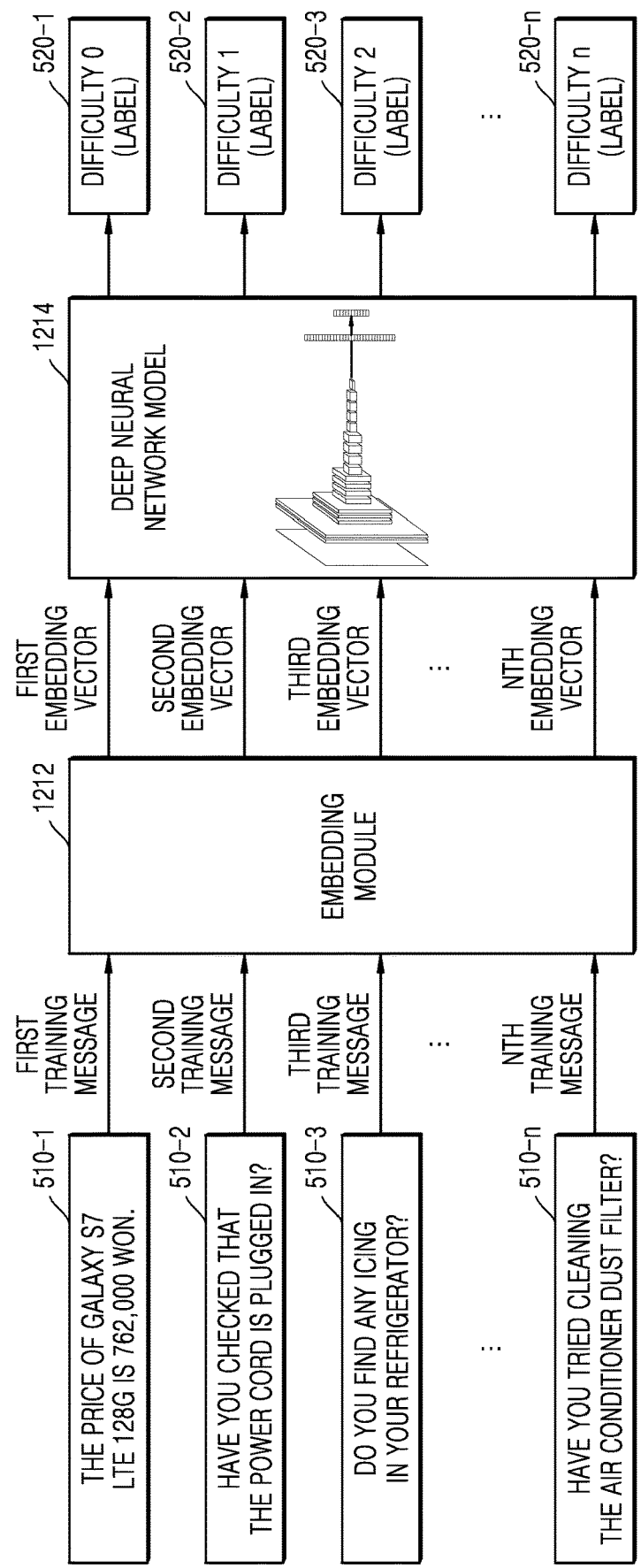
FIG. 5A is a diagram illustrating a method, performed by an electronic apparatus, of training a deep neural network model for classification of a difficulty level of a response message, according to an embodiment of the disclosure.

FIG. 5A is a diagram illustrating a method, performed by an electronic apparatus, of training a deep neural network model for classification of a difficulty level of a response message, according to an embodiment of the disclosure.

Referring to FIG. 5A, the electronic apparatus 1000 may train the deep neural network model 1214 by applying a plurality of training messages 510-1 to 510-$n$ (hereinafter, also referred to as a first training message 510-1 and a second training message 510-2) for training as an input and applying the label values 520-1 to 520-$n$ of the difficulties for each of the plurality of training messages 510-1 to 510-$n$ as an output groundtruth. The plurality of training messages 510-1 to 510-$n$, which are previously obtained messages for training the deep neural network model 1214, may include examples of the response messages of the chatbot to the input messages of the user. The plurality of training messages 510-1 to 510-$n$ may include contexts related to requesting, questioning, answering, or provision of information. The plurality of training messages 510-1 to 510-$n$ may be, for example, "The price of Galaxy S7 LTE 128G is 762,000 won." or "Have you checked whether the power cord is plugged in?"

The plurality of training messages 510-1 to 510-$n$ may be input to an embedding module 1212 before being input to the deep neural network model 1214. The embedding module 1212 may parse an input text and extract at least one word therefrom, and may quantify the extracted at least one extracted word to a vector. For example, the embedding module 1212 may convert at least one word to an embedding vector, by using known machine learning models, such as word2vec, GloVe, or onehot coding. However, the embedding model used by the embedding module 1212 is not limited to the above-described examples.

The processor 1200 (refer to FIG. 3) of the electronic apparatus 1000 may extract at least one word by parsing the plurality of training messages 510-1 to 510-$n$ in units of words by using the embedding module 1212, and convert the extracted word into an embedding vector. The processor 1200 may arrange the embedding vector of at least one word in the form of a matrix. In the embodiment of the disclosure shown in FIG. 5A, a first training message 510-1 may be converted into a first embedding vector by the embedding module 1212, and a second training message 510-2 may be converted to a second embedding vector by the embedding module 1212.

The processor 1200 may input the embedding vector to the deep neural network model 1214. In this case, the embedding vector may be input as a feature vector into the deep neural network model 1214.

The deep neural network model 1214 is an artificial intelligence model configured to perform training by using the embedding vector provided from the embedding module 1212. According to an embodiment of the disclosure, the deep neural network model 1214 may be trained through supervised learning wherein the embedding vector is applied as an input and the label values 520-1 to 520-$n$ of the difficulties are applied as a groundtruth. Here, "difficulty level" means the degree of difficulty and ease of solving problems through requests, questions, answers, or provision of information by a plurality of training messages 510-1 to 510-$n$. In the embodiment of the disclosure shown in FIG. 5A, the difficulty level may be an integer value ranging from 0 to n, but is not limited thereto. The "label value of the difficulty level" means a preset numerical value with respect to difficulty. For example, the first training message 510-1 "The price of the Galaxy S7 LTE model is 762,000 won." may be mapped as difficulty level 0 and thus, a first label value 520-1 of difficulty level 0 may be trained as an output groundtruth, and the second training message 510-2 "Have you checked that the power cord is plugged in?" may be mapped as difficulty level 1 and thus, a second label value 520-2 of difficulty level 1 may be trained as an output groundtruth.

According to an embodiment of the disclosure, the deep neural network model 1214 may include a plurality of hidden layers, which are inner layers that perform operations. The deep neural network model 1214 may include at least one of, for example, a CNN, a recurrent neural network model (RNN), a RBM, a DBN, a BRDNN, or Deep Q-Networks, but is not limited to the above-described examples. However, the deep neural network model 1214 is not limited to the above-described examples, and may include all known neural network model based on deep learning.

When the deep neural network model 1214 is implemented as the CNN, by using a filter having a preset size and a preset number of channels, feature values may be extracted from the embedding vector which is applied as an input, a plurality of layers including the extracted feature values may be obtained, and, by applying weight to the plurality of layers, the feature vector map may be obtained. In the process of obtaining the feature vector map, a rectified linear unit (ReLU) model may be used, and to improve efficiency, the training model may be regularized through dropout, and an operation of performing pooling or max pooling may further be added to the process. Then, the feature values obtained through pooling or max pooling are incorporated through fully connected layers, and may be trained to output labels related to a compression ratio value through activation functions including softmax, sigmoid, and hyperbolic tangent. The value of the parameters included in the deep neural network model 1214 may be changed through training of the deep neural network model 1214. For example, the weight and bias value of layers included in the deep neural network model 1214 may be changed.

Figure 5B:
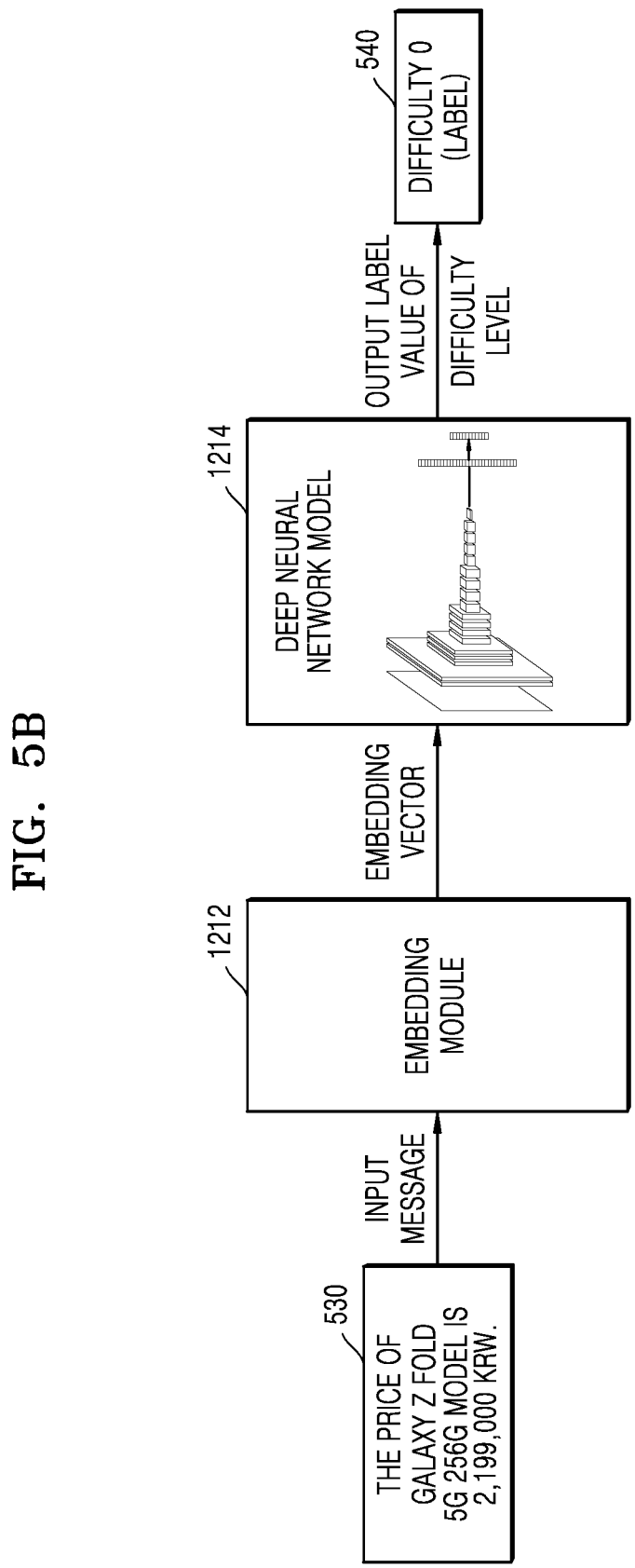
FIG. 5B is a diagram illustrating a method, performed by an electronic apparatus, of obtaining difficulty level information about a response message by using a deep neural network model, according to an embodiment of the disclosure.

FIG. 5B is a diagram illustrating a method, performed by an electronic apparatus, of obtaining difficulty level information about a response message by using a deep neural network model according to an embodiment of the disclosure.

Referring to FIG. 5B, the electronic apparatus 1000 may output the response message 530 to the input message of the user. The output response message 530 may first be input to the embedding module 1212 by the electronic apparatus 1000 before being input to the deep neural network model 1214. The embedding module 1212 may extract at least one word by parsing the input text into units of words when the text included in the response message 530 is input thereto, and may output the embedding vector by quantifying the at least one extracted word. The embedding vector output through the embedding module 1212 may be input to the deep neural network model 1214.

The deep neural network model 1214 is, as illustrated in FIG. 5A, an artificial intelligence model trained through supervised learning wherein the plurality of training messages 510-1 to 510-*n* (refer to FIG. 5A) are applied as an input, and the label values 520-1 to 520-*n* (refer to FIG. 5A) of the difficulties are applied as an output groundtruth. When the embedding vector converted from the response message 530 is input to the deep neural network model 1214, the label value predicted to be the difficulty level of the response message 530 may be output. In the embodiment of the disclosure shown in FIG. 5B, the difficulty level of the response message 530 "The price of Galaxy Z fold 5G 256G model is 2,199,000 won." may be predicted to be 0, and the label value of difficulty level 0 may be output through the deep neural network model 1214.

Figure 5C:
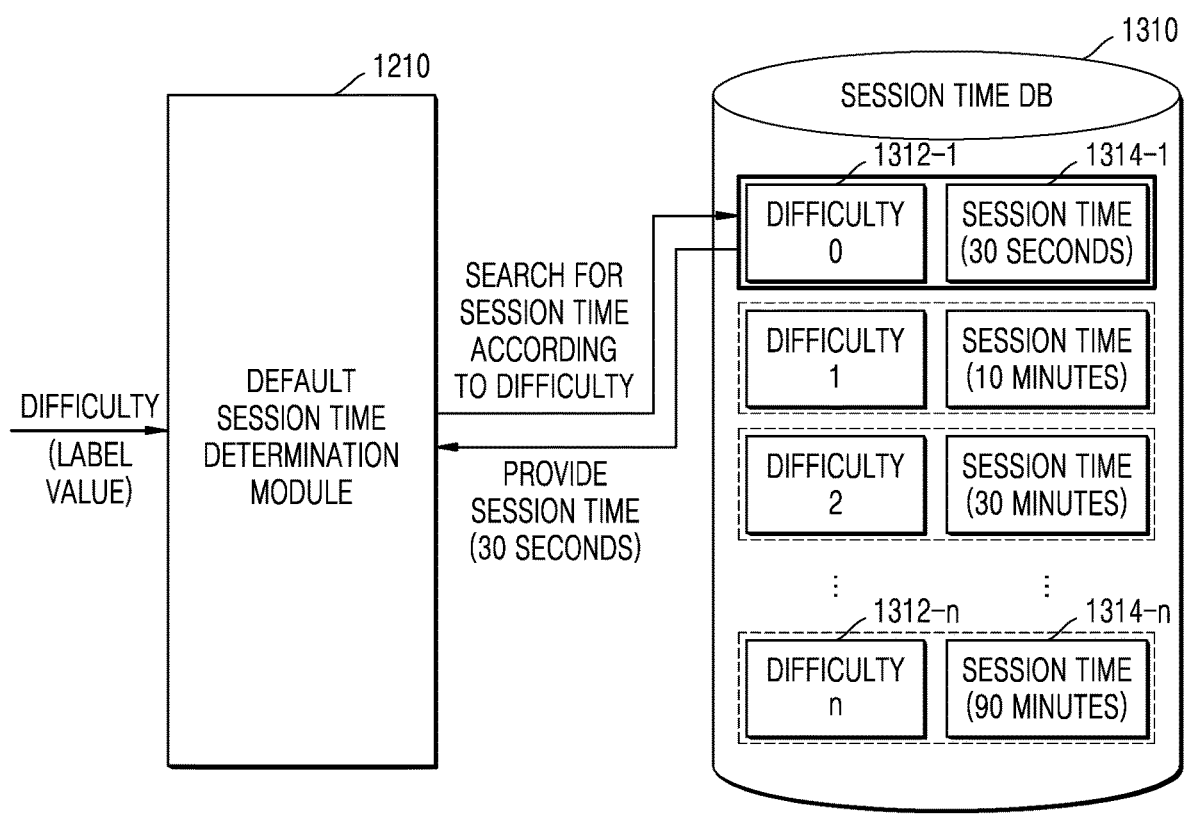
FIG. 5C is a diagram illustrating a method, performed by an electronic apparatus, of determining a default session time based on a difficulty level, according to an embodiment of the disclosure.

FIG. 5C is a diagram illustrating a method, performed by an electronic apparatus, of determining a default session time based on a difficulty level according to an embodiment of the disclosure.

Referring to FIG. 5C, the label value of the difficulty level of the response message 530 (refer to FIG. 5B) output through the deep neural network model 1214 (refer to FIG. 5B) may be input to the default session time determination module 1210. The default session time determination module 1210 is a module configured to obtain information about the difficulty level of the response message 530 and determine the default session time based on the difficulty level of the response message 530. According to an embodiment of the disclosure, the default session time determination module 1210 may search for the session time according to the difficulties from the session time DB 1310.

The session time DB 1310 is a database that stores the session time according to the difficulty level. According to an embodiment of the disclosure, the session time DB 1310 may store label values 1312-1 to 1312-*n* (hereinafter, also referred to as a first label value 1312-1 and an nth label value 1312-*n*) of a plurality of difficulties and data of the plurality of session times 1314-1 to 1314-*n* (hereinafter, also referred to as a first session time 1314-1 and an nth session time 1314-*n*). The plurality of session times 1314-1 to 1314-*n* may be mapped to correspond to each of the label values 1312-1 to 1312-*n* of the plurality of difficulties. According to an embodiment of the disclosure, the session time DB 1310 may store the label values 1312-1 to 1312-*n* of the plurality of difficulties and the data of the plurality of session times 1314-1 to 1314-*n* as a key-value type. In the embodiment of the disclosure shown in FIG. 5C, a first label value 1312-1 of difficulty level 0 and a first session time 1314-1 of 30 seconds may be stored as a key-value type in the session time DB 1310. Likewise, an nth label value 1312-*n* of difficulty level n and an nth session time 1314-*n*, which is 90 minutes, may be stored as a key-value type in the session time DB 1310.

The electronic apparatus 1000 may search for the session time according to the difficulty level of the response message from the session time DB 1310 and be provided with information about the session time by using the default session time determination module 1210. In the embodiment shown in FIG. 5C, the default session time determination module 1210 may receive input of a label value of the difficulty level of the response message 530 (refer to FIG. 5B), and may search for the first session time 1314-1, which is the session time corresponding to the label value of difficulty level 0 in the session time DB 1310. The first session time 1314-1 may be 30 seconds, and the default session time determination module 1210 may obtain information about the session time (30 seconds) from the session time DB 1310.

Figure 6:
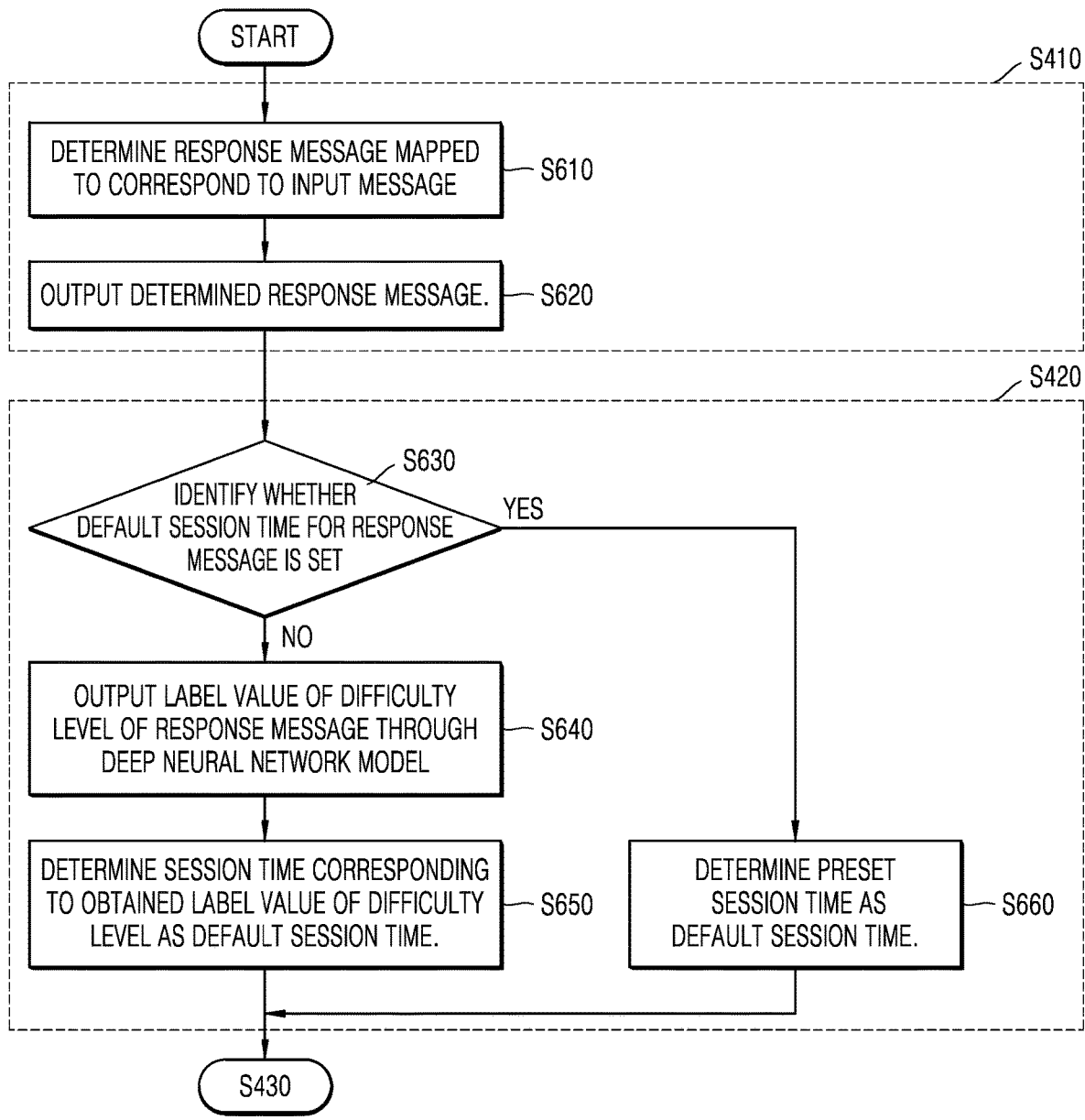
FIG. 6 is a flowchart illustrating an operating method of an electronic apparatus according to an embodiment of the disclosure.

FIG. 6 is a flowchart illustrating an operating method of an electronic apparatus according to an embodiment of the disclosure.

Referring to FIG. 6, operations S610 and S620 among the operations illustrated in FIG. 6 are details of operation S410 illustrated in FIG. 4. Operations S630 to S660 illustrated in FIG. 6 are details of operation S420 illustrated in FIG. 4.

In operation S610, the electronic apparatus 1000 may determine the response message mapped to correspond to the input message. The electronic apparatus 1000 may recognize the domain, intent, and entity of the input message by analyzing the input message received from the user. According to an embodiment of the disclosure, the electronic apparatus 1000 may parse the text in units of morphemes, words, or phrases by using the natural language understanding model, and infer the meaning of the parsed texts by using the linguistic features (for example, grammatical elements) of morphemes, words, or phrases. The electronic apparatus 1000 may recognize the domain, intent, and entity by comparing the inferred meaning of the word with each of a predefined domain, intent, and entity provided by the natural language understanding model.

The electronic apparatus 1000 may output the response message regarding the recognized domain, intent, and entity. According to an embodiment of the disclosure, the response message may be preset to correspond to the domain, intent, and entity. However, the disclosure is not limited thereto, and the electronic apparatus 1000 may generate a response message related to the domain, intent, and entity by using the natural language generation model.

In operation S620, the electronic apparatus 1000 may output the determined response message.

In operation S630, the electronic apparatus 1000 may identify whether the default session time for the response message is set.

In operation S640, when the default session time for the response message is not set, the electronic apparatus 1000 may output the label value of the difficulty level of the response message through the deep neural network model. Here, the "deep neural network model" is an artificial model trained through supervised learning wherein the plurality of training messages are applied as an input, and the label value of the difficulty level set with respect to each of the plurality of training messages is applied as an output groundtruth. The deep neural network model is a model trained prior to the time of receiving the input message from the user in operation S610. The electronic apparatus 1000 may obtain the label value predicted to be the difficulty level of the response message by applying the response message to the deep neural network model as an input.

In operation S650, the electronic apparatus 1000 may determine the session time corresponding to the obtained label value of the difficulty level as the default session time. According to an embodiment of the disclosure, the electronic apparatus 1000 may search the session time DB 1310 (refer to FIG. 5C) by using the obtained label value of the difficulty level through the deep neural network model to obtain the session time mapped to correspond to the label value. The electronic apparatus 1000 may determine the session time obtained from the session time DB 1310 as the default session time.

The default session time may be defined according to the information, response, or request provided by the response message. In operation S660, when the default session time for the response message is set, the electronic apparatus 1000 may determine the preset session time as the default session time.

Figure 7:
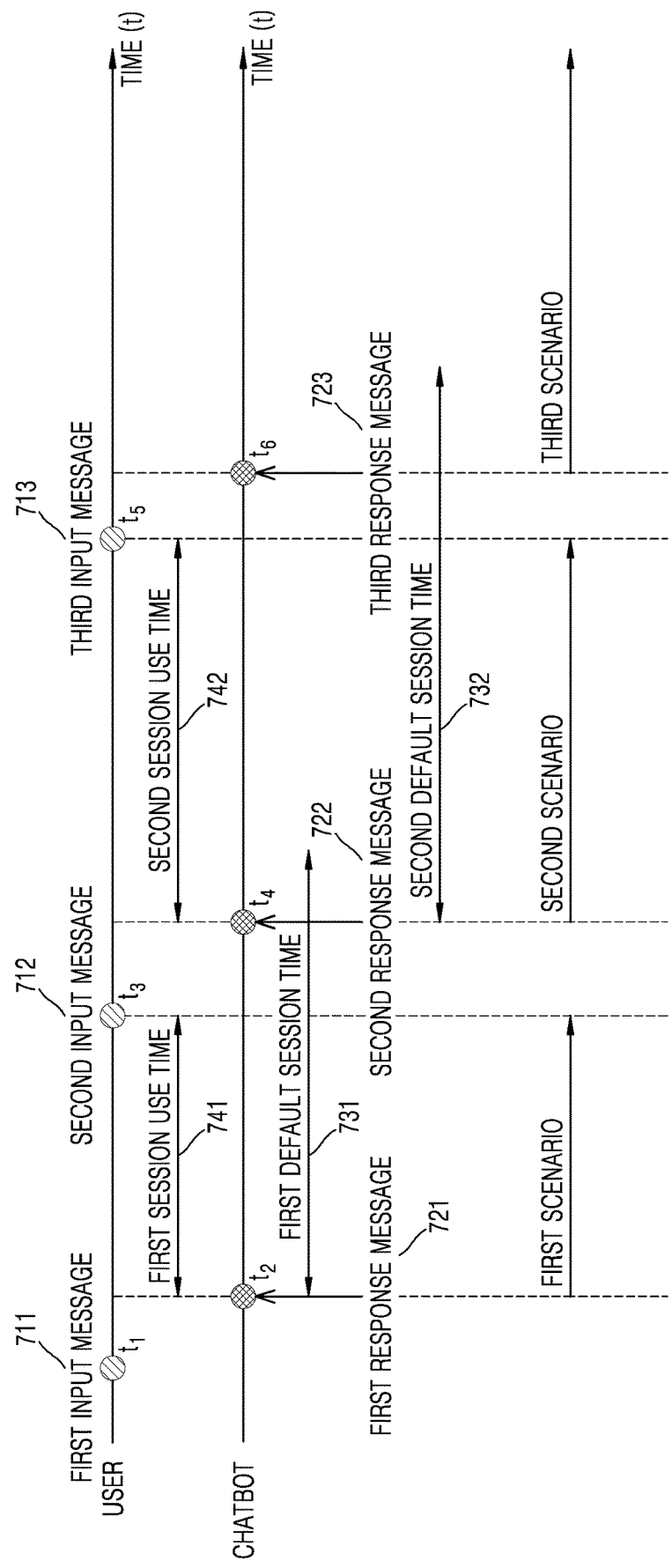
FIG. 7 is a time table illustrating a relationship between a default session time and a session use time according to an input message input by a user and a response message provided by a chatbot, respectively, according to an embodiment of the disclosure.

FIG. 7 is a time table 700 illustrating a relation between a default session time and a session use time according to an input message input by a user and a response message provided by a chatbot according to an embodiment of the disclosure.

Referring to FIG. 7, when a first input message 711 is input by the user at a first time point $t_1$, the chatbot may output a first response message 721 (hereinafter, the first response message 721 and a second response message 722 may also be referred to as the previously output response message 721 and the previously output response message 722) regarding the first input message 711 at a second time point $t_2$. The first default session time 731 may be provided for a preset time from the second time point $t_2$ at which the first response message 721 is output. The detailed method of determining the default session time has been described with reference to FIGS. 5C and 6, and thus, the redundant descriptions are omitted. The user may input a second input message 712 at a third time point $t_3$ prior to the first default session time 731 elapsing, and in this case, the session time may be updated.

A first session using time 741 refers to the time used by the user for performing a certain operation according to a request, answer, or provision of information by the first response message 721 after the second time point $t_2$ at which the user is provided with the first response message 721, or the time used until the third time point $t_3$ at which the second input message 712 is input for additional questioning or additional requesting. For example, the first default session time 731 may be 5 minutes, and the first session use time 741 may be 4 minutes. When the session use time exceeds the default session time, the session may be terminated.

The chatbot may output a second response message 722 related to the second input message 712 at a fourth time point $t_4$. In the same manner as the first default session time 731, a second default session time 732 may be provided for a preset time from the fourth time point $t_4$ at which the second response message 722 is output. The user may input a third input message 713 at a fifth time point $t_5$ prior to the second default session time 732 elapsing, and in this case, the session time may be updated.

A second session using time 742 refers to the time used by the user for performing a certain operation according to a request, answer, or provision of information by the second response message 722 after the fourth time point $t_4$ at which the user is provided with the second response message 722, or the time used until the fifth time point $t_5$ at which the third input message 713 is input for additional questioning or additional requesting. For example, the second default session time 732 may be 10 minutes, and the second session use time 742 may be 6 minutes.

The "scenario" refers to a problem solving operation (or process), such as requesting, questioning, answering, or providing information provided by the chatbot with respect to the input message of the user. According to an embodiment of the disclosure, the scenario may be defined as the time point at which the response message is provided to the user to the time point at which the additional input message of the user is input. In the embodiment of the disclosure shown in FIG. 7, a first scenario may refer to a time interval between the second time period $t_2$ at which the first response message 721 is output and the third time period $t_3$ at which the second input message 712 is input, and a second scenario may refer to a time interval between the fourth time period $t_4$ at which the second response message 722 is output and the fifth time period $t_5$ at which the third input message 713 is input.

The electronic apparatus 1000 may determine the additional session time based on information about at least one of the number of previously output response messages prior to the outputting of the currently output response message or the session use time used in the scenario performed through the previously output response message. According to an embodiment of the disclosure, the electronic apparatus 1000 may determine whether to provide an additional session time when the number of the previously output response messages is one or more. A preset rate of the sum of the session use time for each scenario may be determined as the additional session time. A detailed embodiment of the disclosure wherein the electronic apparatus 1000 determines the additional session time will be described with reference to FIGS. 8 to 10.

Figure 8:
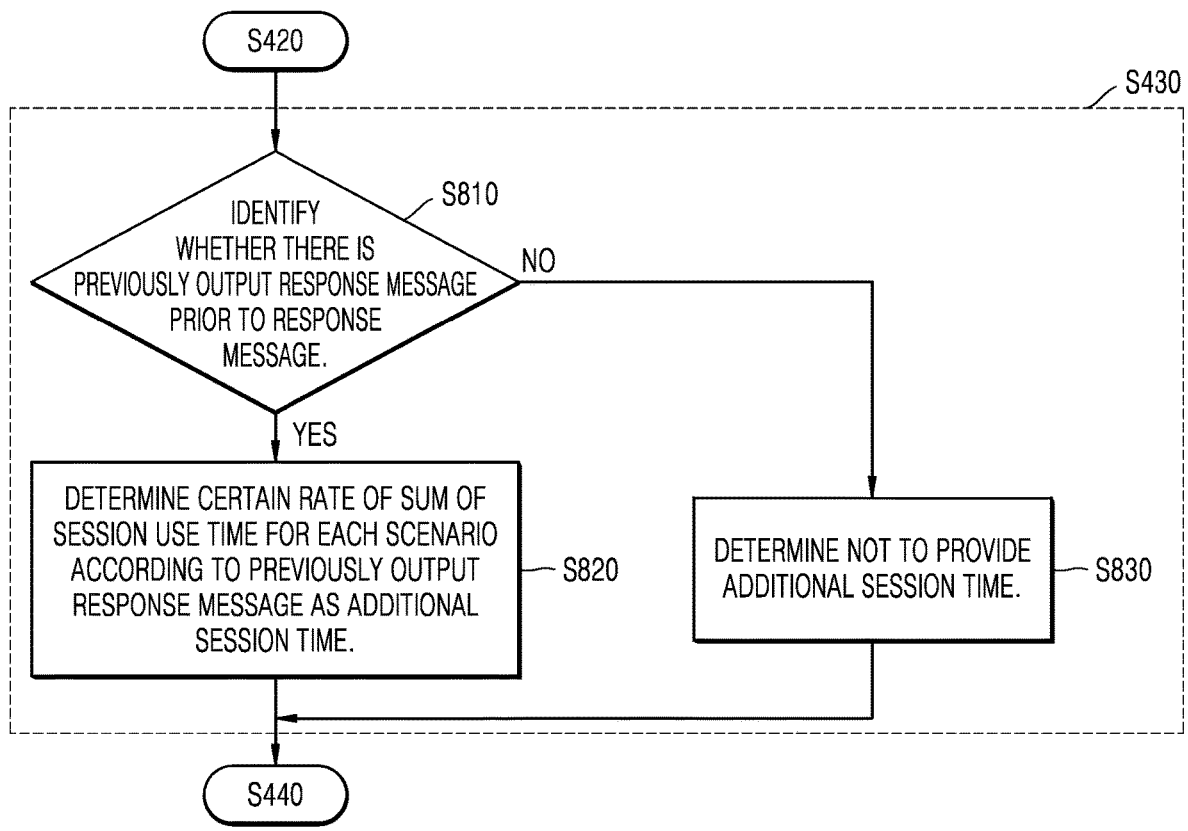
FIG. 8 is a flowchart illustrating a method, performed by an electronic apparatus, of determining whether to provide an additional session time, according to an embodiment of the disclosure.

FIG. 8 is a flowchart illustrating a method, performed by an electronic apparatus, of determining whether to provide an additional session time, according to an embodiment of the disclosure.

Referring to FIG. 8, operations S810 to S830 illustrated in FIG. 8 are details of operation S430 illustrated in FIG. 4. Operation S810 may be performed after operation S420 illustrated in FIG. 4 is performed. Operation S440 illustrated in FIG. 4 may be performed after operations S820 and S830 are performed.

In operation S810, the electronic apparatus 1000 may identify whether there is a previously output response message prior to the response message.

In operation S820, when it is confirmed that there is a previously output response message, the electronic apparatus 1000 may determine a certain rate of the sum of the session use time for each scenario according to the previously output response message as the additional session time. Referring to FIG. 7, when the currently output response message is a third response message 723 (refer to FIG. 7) (hereinafter, also referred to as current response message 723 or currently output response message 723), because two response messages including the first response message 721 (refer to FIG. 7) and the second response message 722 (refer to FIG. 7) were output, the electronic apparatus 1000 may determine whether to provide the additional session time. In addition, because the first session use time 741 (refer to FIG. 7) and the second session use time 742 (refer to FIG. 7) are used in the first scenario and the second scenario, respectively, the electronic apparatus 1000 may determine a certain rate of the sum of the first session use time 741 and the second session use time 742, for example, 20%, as the additional session time. For example, when the first session use time 741 is 4 minutes and the second session use time 742 is 6 minutes, the electronic apparatus 1000 may determine 2 minutes, that is, 20% of 10 minutes, which is the sum of the first session use time 741 and the second session use time 742, as the additional session time for the third response message 723 (refer to FIG. 7).

In operation S830, when it is confirmed that there is no previously output response message, that is, when the currently output response message is the first response message first, the electronic apparatus 1000 may determine not to provide the additional session time.

Figure 9:
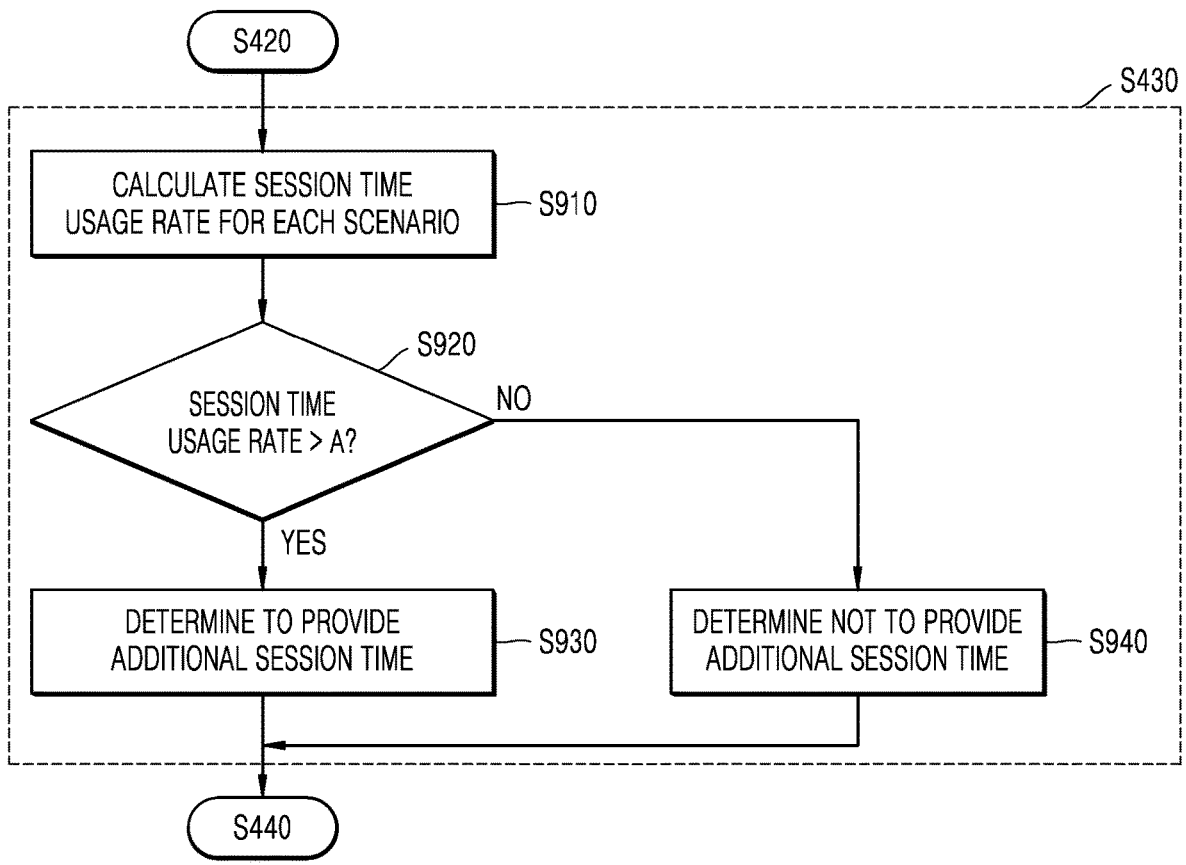
FIG. 9 is a flowchart illustrating a method, performed by an electronic apparatus, of determining whether to provide an additional session time, according to an embodiment of the disclosure.

FIG. 9 is a flowchart illustrating a method, performed by an electronic apparatus, of determining whether to provide an additional session time according to an embodiment of the disclosure.

Referring to FIG. 9, operations S910 to S940 illustrated in FIG. 9 are details of operation S430 illustrated in FIG. 4. Operation S910 may be performed after operation S420 illustrated in FIG. 4 is performed. Operation S440 illustrated in FIG. 4 may be performed after operations S930 and S940 are performed.

In operation S910, the electronic apparatus 1000 may calculate the session time usage rate for each scenario. According to an embodiment of the disclosure, the electronic apparatus 1000 may calculate the session time usage rate by performing an arithmetic operation of dividing the session use time by the default session time. For example, when the default session time is 10 minutes, and the session use time is 6 minutes, the session time usage rate is 60%.

According to an embodiment of the disclosure, the electronic apparatus 1000 may calculate the session time usage rate for each scenario according to the previously output response message. Referring to FIG. 7, when the currently output response message is the third response message 723 (refer to FIG. 7), the electronic apparatus 1000 may calculate a first session time usage rate of the first scenario and a second session time usage rate of the second scenario. For example, when the first default session time 731 (refer to FIG. 7) is 5 minutes and the first session use time 741 (refer to FIG. 7) is 4 minutes in the first scenario, the first session time usage rate is 80%, and when the second default session time 732 (refer to FIG. 7) is 10 minutes and the second session use time 742 (refer to FIG. 7) is 6 minutes in the second scenario, the second session time usage rate is 60%.

In operation S920, the electronic apparatus 1000 may compare the session time usage rate with a preset threshold α. The electronic apparatus 1000 may determine whether the session time usage rate exceeds the threshold α.

In operation S930, when the session time usage rate exceeds the preset threshold α, the electronic apparatus 1000 may determine to provide the additional session time. For example, when the preset threshold α is 50%, because the first session time usage rate is 80% and the second session time usage rate is 60%, the electronic apparatus 1000 may determine that the session time usage rate has exceeded the preset threshold α and determine to provide the additional session time.

The additional session time may be determined as a certain rate of the sum of the session use time for each scenario. For example, when the first session use time is 4 minutes and the second session use time is 6 minutes, the additional session time may be determined as 2 minutes, that is, 20% of the sum of the first session use time and the second session use time.

In operation S940, when the session time usage rate is equal to or less than the preset threshold α, the electronic apparatus 1000 may determine not to provide the additional session time.

Figure 10:
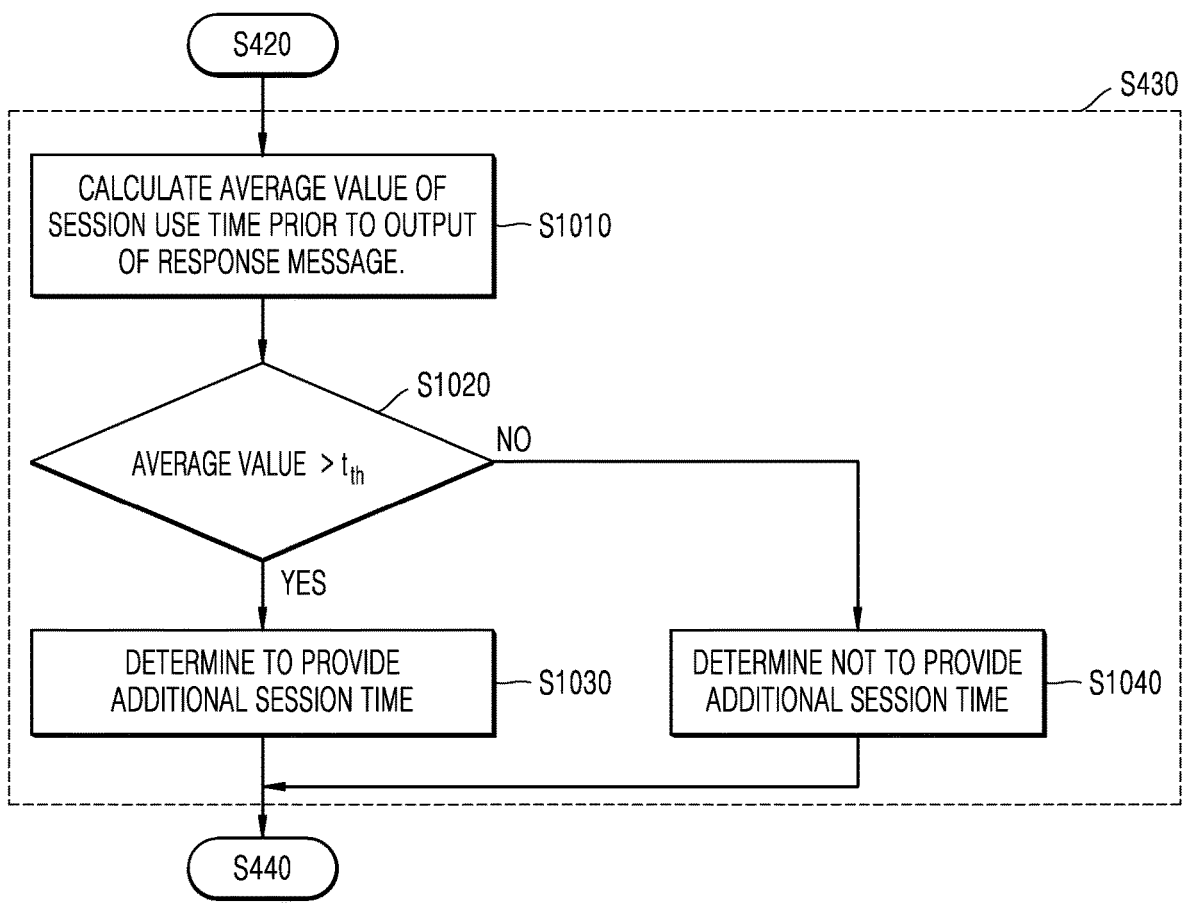
FIG. 10 is a flowchart illustrating a method, performed by an electronic apparatus, of determining whether to provide an additional session time, according to an embodiment of the disclosure.

FIG. 10 is a flowchart illustrating a method, performed by an electronic apparatus, of determining whether to provide an additional session time, according to an embodiment of the disclosure.

Referring to FIG. 10, operations S1010 to S1040 illustrated in FIG. 10 are details of operation S430 illustrated in FIG. 4. Operation S1010 may be performed after operation S420 illustrated in FIG. 4 is performed. Operation S440 illustrated in FIG. 4 may be performed after operations S1030 and S1040 are performed.

In operation S1010, the electronic apparatus 1000 may calculate an average value of the session use time prior to the outputting of the response message. Referring to FIG. 7, when the currently output response message is the third response message 723 (refer to FIG. 7), the electronic apparatus 1000 may calculate the average value of the session use time in the first scenario and the session use time in the second scenario. For example, when the first session use time 741 (refer to FIG. 7) used in the first scenario is 4 minutes and the second session use time 742 (refer to FIG. 7) used in the second scenario is 6 minutes, the average value may be calculated as 5 minutes.

In operation S1020, the electronic apparatus 1000 may compare the calculated average value with the preset threshold $t_{th}$ is to determine whether the average value exceeds the threshold $t_{th}$.

In operation S1030, when the average value exceeds the preset threshold $t_{th}$, the electronic apparatus 1000 may determine to provide the additional session time. For example, when the preset threshold $t_{th}$ is 3 minutes, because the calculated average value is 5 minutes in operation S1010, the electronic apparatus 1000 may determine to provide the additional session time.

The additional session time may be determined as a certain rate of the sum of the session use time for each scenario. For example, when the first session use time is 4 minutes and the second session use time is 6 minutes, the additional session time may be determined as 2 minutes, that is, 20% of the sum of the first session use time and the second session use time.

In operation S1040, when the average value is equal to or less than the preset threshold $t_{th}$, the electronic apparatus 1000 may determine not to provide the additional session time.

The more previously output response messages there are prior to the currently output response message 723 (refer to FIG. 7), the greater may be the burden on the user to end the session. When time is consumed due to the action taken by the user (for example, checking for failure, identifying the device status, or the like) according to the current response message 723, or when the user fails to input an additional message by mistake, the default session time may elapse, and thus the session may end. In this case, the user may need to repeatedly input the same input message to reach the same response message 723, which is cumbersome and reduces user convenience.

The electronic apparatus 1000 according to the embodiment shown in FIGS. 8 to 10 may provide the additional session time based on at least one information among the number of previously output response messages 721 and 722 (refer to FIG. 7) prior to the currently output response message 723 and the session use time for each scenario according to the previously output response messages 721 and 722, thereby solving the problem of inadvertent end of the session due to the elapse of the default session time. Further, by considering the session use time used by the user to reach the current response message 723, it is possible to provide additional session time optimized for each of the users, thereby improving user convenience.

Figure 11:
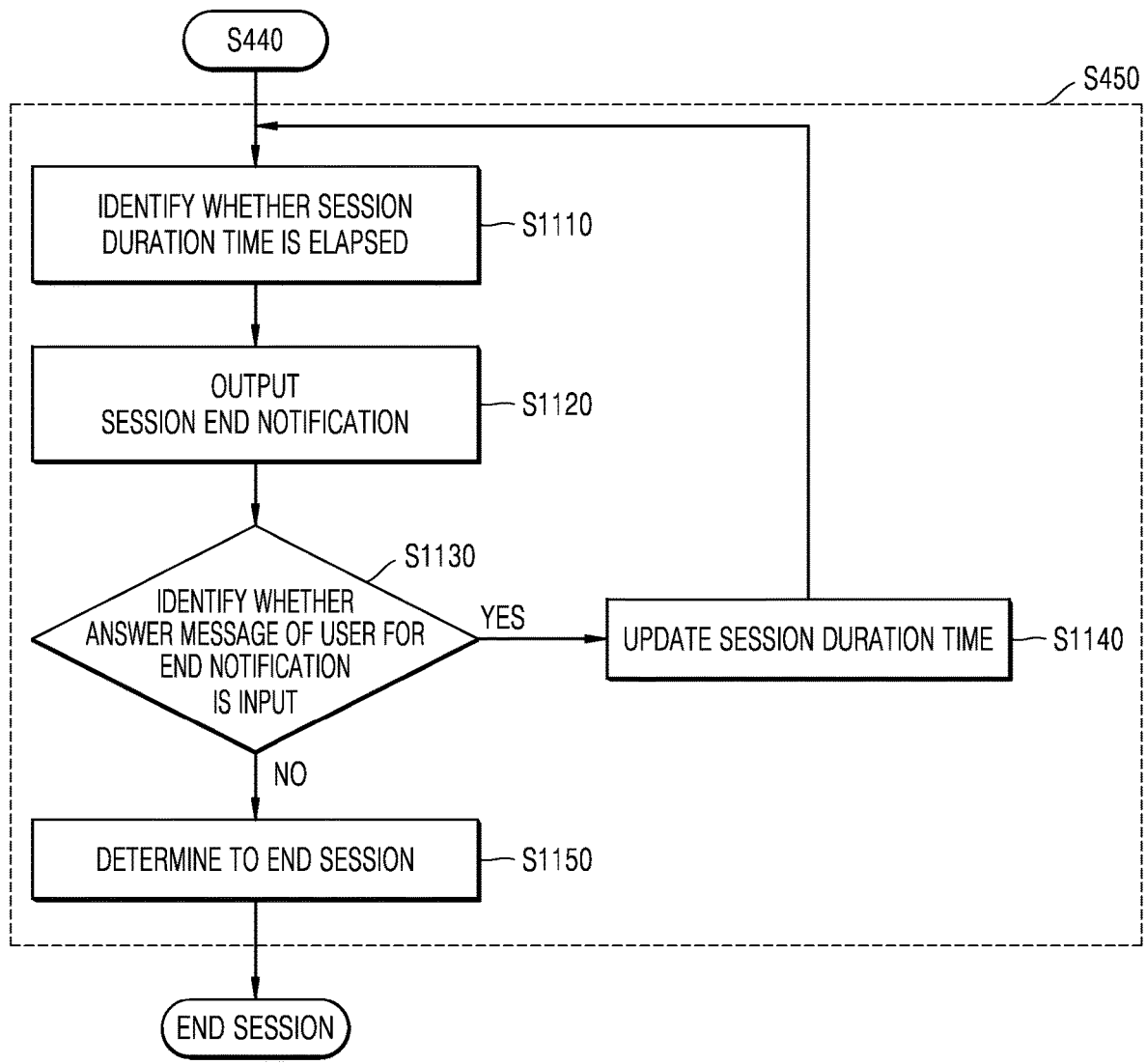
FIG. 11 is a flowchart illustrating a method, performed by an electronic apparatus, of outputting a session end notification, according to an embodiment of the disclosure.

FIG. 11 is a flowchart illustrating a method, performed by an electronic apparatus, of outputting a session end notification according to an embodiment of the disclosure.

Referring to FIG. 11, operations S1110 to S1150 illustrated in FIG. 11 are details of operation S450 illustrated in FIG. 4. Operation S1110 may be performed after operation S440 illustrated in FIG. 4 is performed.

In operation S1110, the electronic apparatus 1000 may identify whether the session duration time has elapsed. According to an embodiment of the disclosure, the session duration time may be determined by the sum of the default session time and additional session time. The electronic apparatus 1000 may identify whether the additional message of the user is input during the session duration time from the point at which the response message is output.

In operation S1120, the electronic apparatus 1000 may output the session end notification 250. According to an embodiment of the disclosure, the electronic apparatus 1000 may generate a message to the user notifying that the session duration time has ended by using the intent and entity related to the response message by using the natural language generation model, and may output the generated response message. The session end notification message may be, for example, "Is the problem regarding the freezer solved? End chat."

In operation S1130, the electronic apparatus 1000 may identify whether the answer message of the user to the end notification is input. The answer message of the user may be a message indicating whether or not the problem has been solved with Y/N, such as "Yes" or "No", but is not limited thereto. The answer messages may be a message related to an additional question or an additional request.

In operation S1140, when the input of the answer message of the user is confirmed, the electronic apparatus 1000 may update the session duration time.

In operation S1150, when it is confirmed that the answer message of the user is not input, the electronic apparatus 1000 may determine to end the session. According to an embodiment of the disclosure, even when the answer message is input, when the answer message is a message notifying the problem is solved (for example, the answer message "Yes" to "Is the problem regarding the freezer solved? End chat."), the electronic apparatus 1000 may determine to end the session.

In the embodiment of the disclosure shown in FIG. 11, the electronic apparatus 1000 may not end the session immediately when the session duration time has elapsed, and may output the session end notification message, thereby notifying whether the session will end to the user and allow the user to input an additional message when needed. Accordingly, the electronic apparatus 1000 of the disclosure may prevent the problem of unintentional session ending and improve user convenience.

Figure 12:
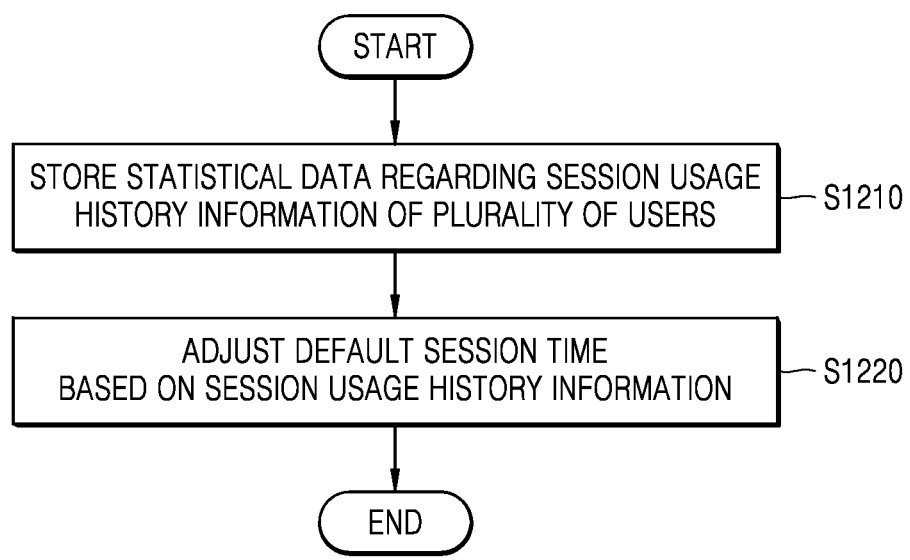
FIG. 12 is a flowchart illustrating a method, performed by an electronic apparatus, of adjusting a default session time, according to an embodiment of the disclosure.

FIG. 12 is a flowchart illustrating a method, performed by an electronic apparatus, of adjusting a default session time according to an embodiment of the disclosure.

Referring to FIG. 12, in operation S1210, the electronic apparatus 1000 may store the statistical data regarding the session usage history information of the plurality of users. According to an embodiment of the disclosure, the session usage history information may be the statistical data of a plurality of users regarding at least one of the number of session extension requests, the number of scenarios performed before the response message is output, or the session use time. According to an embodiment of the disclosure, the electronic apparatus 1000 may classify and store the session usage history information for each response message.

In operation S1220, the electronic apparatus 1000 may adjust the default session time based on the session usage history information. The electronic apparatus 1000 may extend or reduce the default session time based on the session usage history information of the plurality of users regarding the currently output response message. A detailed embodiment of the disclosure wherein the electronic apparatus 1000 extends or reduces the default session time will be described with reference to FIG. 13.

Figure 13:
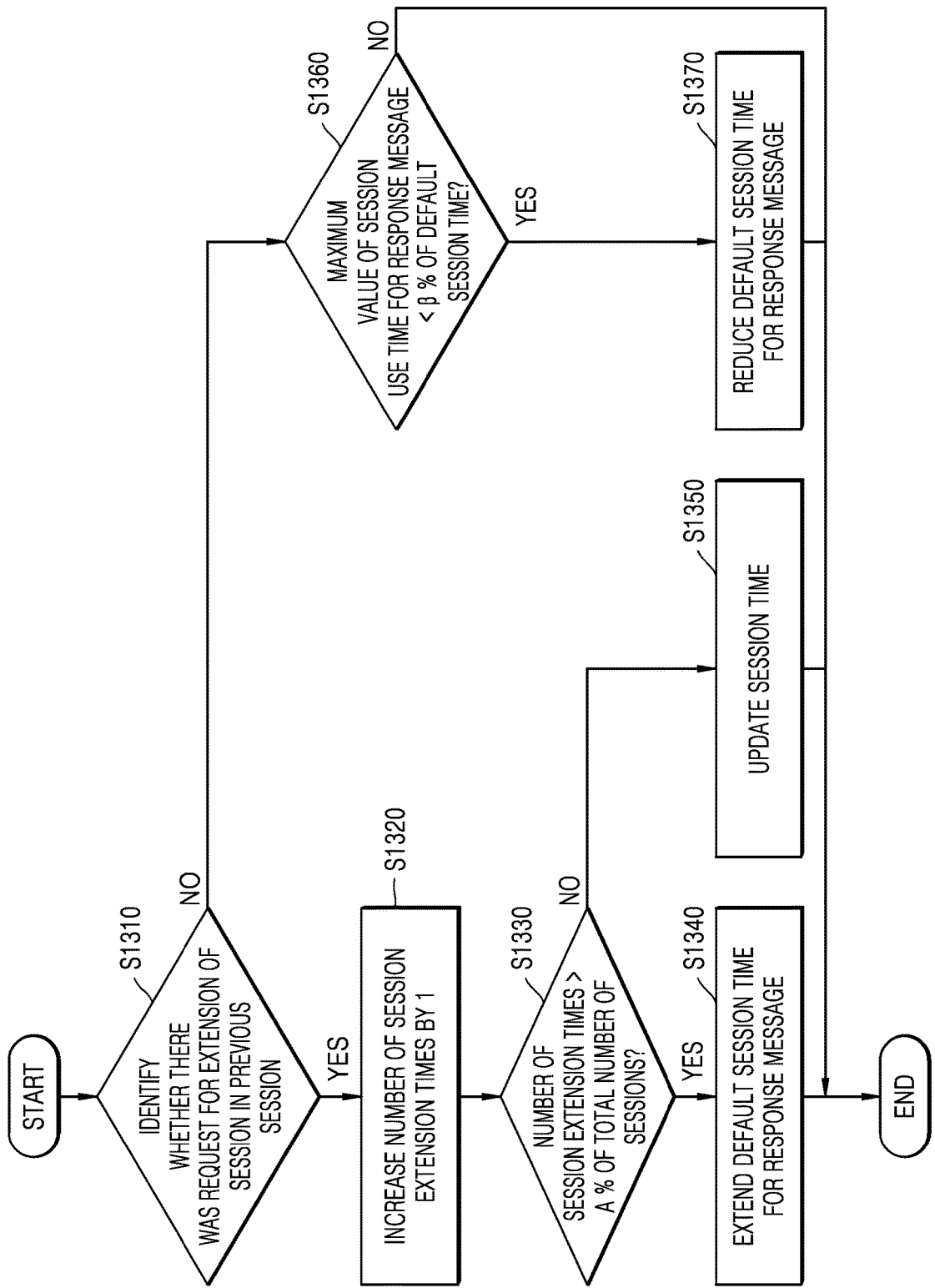
FIG. 13 is a flowchart illustrating a method, performed by an electronic apparatus, of extending or reducing a default session time, according to an embodiment of the disclosure.

FIG. 13 is a flowchart illustrating a method, performed by an electronic apparatus, of extending or reducing a default session time according to an embodiment of the disclosure.

Referring to FIG. 13, in operation S1310, the electronic apparatus 1000 may identify whether there was a request for extension of the session in the previous session. According to an embodiment of the disclosure, the electronic apparatus 1000 may search for statistical data regarding the session usage history information about the currently output response message, from the session usage history information of the plurality of users stored in the session usage history statistics DB 1320 (refer to FIG. 3). The session usage history statistics DB 1320 is a database for storing statistical data regarding the session usage history of the plurality of users. The electronic apparatus 1000 may obtain information about whether there had been a session extension request by the plurality of users in the previous session prior to the outputting of the response message according to the search result of the session usage history statistics DB 1320.

In operation S1320, when it is confirmed that there is the session extension request, the electronic apparatus 1000 may increase the number of session extension times by one.

In operation S1330, the electronic apparatus 1000 may determine whether the number of session extension times exceeds α % of the total number of sessions.

In operation S1340, when the number of session extension times is confirmed to exceed α % of the total number of sessions, the electronic apparatus 1000 may extend the default session time for the response message.

In operation S1350, when the number of session extension times is confirmed to be α % or less of the total number of sessions, the electronic apparatus 1000 may update the session time.

In operation S1360, when it is confirmed that there is no session extension request in the previous session, the electronic apparatus 1000 may determine whether the maximum value of the session use time for the response message is less than β % of the default session time. According to an embodiment of the disclosure, the electronic apparatus 1000 may obtain information about the session use time of the plurality of users for the response message currently output from the session usage history statistics DB 1320. The electronic apparatus 1000 may identify the maximum value of the session use time from information about the session use time of the plurality of users, obtained from the session usage history statistics DB 1320, and determine whether the maximum value is less than β % (for example, 50%) of the default session time.

In operation S1370, when the maximum value of the session use time is less than β %, the electronic apparatus 1000 may reduce the default session time for the response message. The electronic apparatus 1000 may reduce the default session time by, for example, 25%.

The electronic apparatus 1000 according to the embodiments of the disclosure illustrated in FIGS. 12 and 13 may store the session usage history information of other users regarding the response message and extend or reduce the default session time by using the stored session usage history information of the plurality of users, thereby having a technical effect of adaptively adjusting the default session time by reflecting a plurality of user experiences.

The program executed by the electronic apparatus 1000 described herein may be implemented as hardware components, software components, and/or the combination of hardware components and software components. A program may be executed by any system capable of executing computer-readable instructions.

Software may include a computer program, a code, an instruction, or a combination thereof, and may configure a processing device to operate as desired or independently or collectively command the processing device.

Software may be implemented as a computer program including an instruction stored in a computer-readable storage media. Examples of the computer-readable recording medium may include magnetic storage media (e.g., a ROM, a RAM, floppy disks, and hard disks) and optical recording media (e.g., a compact disc-ROM (CD-ROM) and digital versatile discs (DVDs)). The computer-readable recording medium may also be distributed over network coupled computer systems so that a computer-readable code is stored and executed in a distributed fashion. The medium may be read by a computer, stored in a memory, and executed by a processor.

The computer-readable storage medium may be provided in the form of a non-transitory storage medium. The term "non-transitory" simply means that the storage medium is a tangible device, and does not include a signal, but this term does not differentiate between where data is semi-permanently stored in the storage medium and where the data is temporarily stored in the storage medium.

A program according to embodiments of the disclosure disclosed in the specification may be included and provided in a computer program product. The computer program product may be traded as a product between a seller and a buyer.

The computer program product may include a software (S/W) program and a non-transitory computer-readable recording medium in which the S/W program is stored. For example, the computer program product may include a software program-type product (for example, a downloadable application) electronically distributed by a manufacturer of the device or electronic markets (for example, Google Play™ store, App Store, or the like). For the electronic distribution, at least a part of the software program may be stored in a storage medium or temporarily generated. In this case, the storage medium may be a storage medium of a server in the manufacturer, the server of the electronic market, or a relay server that temporarily stores a software program.

The computer program product may include a storage medium of a server or a storage medium of a device in a system including a server and a device. Alternatively, when there is a third device (e.g., a smart phone) communicating with a server or a device, the computer program product may include a storage medium of the third device. Alternatively, the computer program product may include a software program transmitted from the server to the device or the third device or from the third device to the device.

In this case, one of the server, the device, and the third device may execute the method according to embodiments of the disclosure by executing the computer program product. Alternatively, two or more of the server, the device, and the third device may execute the computer program product to execute the method according to the embodiments of the disclosure in a distributed manner.

For example, the server may execute the computer program product stored in the server to control the device communication-connected with the server to perform the method according to the embodiments of the disclosure.

In another example, the third device may execute the computer program product to control the device communicating with the third device to perform the method according the embodiment of the disclosure.

When the third device executes the computer program product, the third device may download the computer program product from the server and execute the downloaded computer program product. Alternatively, the third device may execute the computer program product provided in a free-loaded state and perform the method according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method of determining a session duration time of a chatbot, the method comprising:
    outputting a response message regarding an input message of a user;
    determining a default session time during which a session is maintained based on a difficulty level of the output response message;
    determining an additional session time based on conversation history information through the chatbot prior to outputting of the response message;
    waiting for an input of an additional message of the user during a session duration time, which is a sum of the default session time and the additional session time; and determining an end of the session based on whether the additional message is input, and
    wherein the determining of the default session time comprises: obtaining a label value of the difficulty level by applying the response message to a deep neural network model as an input; and determining a session time mapped to correspond to the obtained label value as the default session time.

2. The method of claim 1, wherein the deep neural network model is trained through supervised learning, wherein a plurality of training messages are applied as an input, and wherein the label value of the difficulty level is applied as an output groundtruth.

3. The method of claim 1, wherein the conversation history information includes information about at least one of a number of previously output response messages in a conversation prior to the outputting of the response message or a session use time in a scenario performed according to the previously output response message.

4. The method of claim 3, wherein the additional session time is determined by a preset ratio of a sum of the session use time for each scenario.

5. The method of claim 1, further comprising: storing session usage history information of a plurality of users regarding the output response message; and adjusting the default session time based on the stored session usage history information of the plurality of users.

6. The method of claim 5, wherein the session usage history information comprises statistical data of the plurality of users regarding at least one of a number of session extension requests at a time point prior to outputting of the response message, a number of scenarios performed prior to the response message, or a session use time used for the response message.

7. An electronic apparatus for determining a session duration time of a chatbot, the electronic apparatus comprising: a communication interface configured to perform transmission and reception of data with other devices; a memory; and a processor configured to execute one or more instructions, wherein the processor is further configured to execute the one or more instructions to: obtain an input message input by a user through the communication interface, output a response message regarding the input message of the user, determine a default session time during which a session is maintained based on a difficulty level of the output response message, determine an additional session time based on a conversation history information through the chatbot prior to outputting of the response message, wait for an input of an additional message by the user during a session duration time, which is a sum of the default session time and the additional session time, and determine an end of the session based on whether the additional message is input, and wherein the processor, to determine the default session time, is further configured to execute the one or more instructions to: obtain an output label value of the difficulty level by applying the response message to a deep neural network model as an input; and determine a session time mapped to correspond to the obtained label value as the default session time.

8. The electronic apparatus of claim 7, wherein the deep neural network model is trained through supervised learning, wherein a plurality of training messages are applied as an input, and wherein the label value of the difficulty level is applied as an output groundtruth.

9. The electronic apparatus of claim 7, wherein the conversation history information comprises information about at least one of a number of previously output response messages in a conversation prior to the outputting of the response message or a session use time in a scenario performed according to the previously output response message.

10. The electronic apparatus of claim 9, wherein the processor is further configured to execute the one or more instructions to determine the additional session time by a preset rate of a sum of the session use time for each scenario.

11. The electronic apparatus of claim 7, wherein the processor is further configured to execute the one or more instructions to: store, in a database of the memory, a session usage history information of a plurality of users regarding the output response message, and adjust the default session time based on the stored session usage history information of the plurality of users.

12. The electronic apparatus of claim 11, wherein the session usage history information comprises statistical data of the plurality of users regarding at least one of a number of session extension requests prior to the outputting of the response message, a number of scenarios performed prior to the response message, or a session use time used for the response message.

13. At least one non-transitory computer program product comprising a computer-readable storage medium, wherein the computer-readable storage medium comprises instructions, performed by a device, for: outputting a response message regarding an input message of a user; determining a default session time during which a session is maintained based on a difficulty level of the output response message; determining an additional session time based on a conversation history information through a chatbot prior to outputting of the response message; waiting for an input of an additional message by the user during a session duration time, which is a sum of the default session time and the additional session time; and determining an end of the session based on whether the additional message is input, wherein the determining of the default session time comprises: obtaining a label value of difficulty level by applying the response message to a deep neural network model as an input, and determining, a session time mapped to correspond to the obtained label value as the default session time.

* * * * *